(12) United States Patent
Reddy et al.

(10) Patent No.: US 7,488,705 B2
(45) Date of Patent: *Feb. 10, 2009

(54) OILWELL SEALANT COMPOSITIONS COMPRISING ALKALI SWELLABLE LATEX

(75) Inventors: B. Raghava Reddy, Duncan, OK (US); Mark R. Savery, Duncan, OK (US); Krishna M. Ravi, Kingwood, TX (US); Donald L. Whitfill, Kingwood, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/010,117

(22) Filed: Dec. 8, 2004

(65) Prior Publication Data

US 2006/0122071 A1    Jun. 8, 2006

(51) Int. Cl.
E21B 33/13 (2006.01)
E21B 43/00 (2006.01)
C09K 8/00 (2006.01)

(52) U.S. Cl. .......... 507/219; 507/118; 507/119; 507/125; 507/221; 507/224; 507/231; 507/269; 166/294; 166/300

(58) Field of Classification Search .......... 507/118, 507/119, 125, 219, 221, 224, 231, 269; 166/294, 166/300
See application file for complete search history.

(56) References Cited

U.S. PATENT DOCUMENTS

| | | | |
|---|---|---|---|
| 2,876,841 A | 3/1959 | Ryan et al. ........ 166/31 |
| 3,042,608 A | 7/1962 | Morris ........ 252/8.5 |
| 3,359,225 A | 12/1967 | Weisend ........ 260/29.6 |
| 3,487,038 A | 12/1969 | Toy et al. ........ 260/29.7 |
| 3,622,127 A | 11/1971 | Burke, Jr. |
| 3,793,244 A | 2/1974 | Megee et al. ........ 260/29.7 H |
| 3,857,918 A | 12/1974 | Wyss et al. |
| 3,887,653 A * | 6/1975 | Konishi et al. ........ 525/301 |
| 3,917,771 A | 11/1975 | Basile |
| 4,062,822 A | 12/1977 | Lesage |
| 4,182,677 A | 1/1980 | Bocard et al. ........ 210/36 |
| 4,301,016 A | 11/1981 | Carriere et al. ........ 252/8.5 C |
| 4,384,096 A | 5/1983 | Sonnabend ........ 526/313 |
| 4,391,643 A | 7/1983 | Murphey ........ 106/74 |
| 4,412,017 A | 10/1983 | Van Eenam |
| 4,486,316 A * | 12/1984 | Carriere et al. ........ 507/119 |
| 4,537,918 A | 8/1985 | Parcevaux et al. ........ 523/130 |
| 4,664,816 A | 5/1987 | Walker ........ 252/8.512 |
| 4,670,501 A | 6/1987 | Dymond et al. ........ 524/458 |
| 4,721,160 A | 1/1988 | Parcevaux et al. |
| 4,767,460 A | 8/1988 | Parcevaux et al. ........ 106/90 |
| 4,777,200 A | 10/1988 | Dymond et al. ........ 524/458 |
| 4,818,288 A | 4/1989 | Aignesberger et al. ........ 106/90 |
| 4,849,018 A | 7/1989 | Babcock et al. |
| 4,861,822 A | 8/1989 | Keskey et al. ........ 524/559 |
| 5,135,577 A | 8/1992 | Brothers ........ 106/724 |
| 5,151,203 A | 9/1992 | Riley et al. ........ 252/8.551 |
| 5,159,980 A | 11/1992 | Onan et al. ........ 166/294 |
| 5,238,064 A | 8/1993 | Dahl et al. ........ 166/293 |
| 5,244,304 A | 9/1993 | Weill et al. ........ 404/67 |
| 5,290,356 A | 3/1994 | Frankowski ........ 106/726 |
| 5,293,938 A | 3/1994 | Onan et al. ........ 166/293 |
| 5,296,627 A | 3/1994 | Tang et al. ........ 558/34 |
| 5,346,012 A | 9/1994 | Heathman et al. ........ 166/293 |
| 5,373,901 A | 12/1994 | Norman et al. ........ 166/300 |
| 5,387,626 A | 2/1995 | Bohme-Kovac et al. ........ 524/35 |
| 5,389,706 A | 2/1995 | Heathman et al. ........ 524/5 |
| 5,403,822 A | 4/1995 | Mueller et al. ........ 507/138 |
| 5,456,751 A | 10/1995 | Zandi et al. ........ 106/724 |
| 5,563,201 A * | 10/1996 | Joanicot et al. ........ 524/425 |
| 5,588,488 A | 12/1996 | Vijn et al. ........ 166/293 |
| 5,688,844 A | 11/1997 | Chatterji et al. ........ 524/8 |

(Continued)

FOREIGN PATENT DOCUMENTS

CN    1458114 A    11/2003

(Continued)

OTHER PUBLICATIONS

Halliburton brochure entitled "Accolade™ Drilling Fluid Exceed New GOM Environmental Standards and Boosts Performance" dated 2002.

(Continued)

*Primary Examiner*—Daniel S Metzmaier
(74) *Attorney, Agent, or Firm*—Craig W. Roddy; Conley Rose, P.C.

(57) ABSTRACT

Sealant compositions comprising an alkali swellable latex and a pH increasing material and methods of using the same to service a wellbore are provided. In one embodiment, the sealant composition can be used in a wellbore and includes an alkali swellable latex and a pH increasing material. The sealant composition can have a pH of from about 7 to about 14. In other embodiments, the pH increasing material includes a base-producing material. The base-producing material can include alkali and alkali earth metal carbonates, alkali and alkali earth metal bicarbonates, alkali and alkali earth metal hydroxides, alkali and alkali earth metal oxides, alkali and alkali earth metal phosphates, alkali and alkali earth metal hydrogen phosphates, alkali and alkaline earth metal sulphides, alkali and alkaline earth metal salts of silicates, alkali and alkaline earth metal salts of aluminates, water soluble or water dispersible organic amines, polymeric amine, amino alcohols, or combinations thereof.

64 Claims, 3 Drawing Sheets

U.S. PATENT DOCUMENTS

| | | | |
|---|---|---|---|
| 5,770,760 A | 6/1998 | Robinson | 560/221 |
| 5,779,787 A | 7/1998 | Brothers et al. | 106/802 |
| 5,780,369 A * | 7/1998 | Allison et al. | 442/384 |
| 5,795,924 A | 8/1998 | Chatterji et al. | 523/130 |
| 5,826,669 A | 10/1998 | Zaleski et al. | 175/75 |
| 5,873,413 A | 2/1999 | Chatterji et al. | 166/293 |
| 5,900,451 A | 5/1999 | Krishnan et al. | 524/502 |
| 5,911,282 A | 6/1999 | Onan et al. | 175/72 |
| 5,913,364 A | 6/1999 | Sweatman | 166/281 |
| 5,945,387 A | 8/1999 | Chatterji et al. | 507/224 |
| 5,964,293 A | 10/1999 | Chatterji et al. | 166/294 |
| 6,060,434 A | 5/2000 | Sweatman et al. | 507/216 |
| 6,063,738 A | 5/2000 | Chatterji et al. | |
| 6,098,711 A | 8/2000 | Chatterji et al. | 166/294 |
| 6,130,287 A | 10/2000 | Krishnam | 524/547 |
| 6,156,808 A | 12/2000 | Chatterji et al. | 516/116 |
| 6,167,967 B1 | 1/2001 | Sweatman | 166/281 |
| 6,177,483 B1 | 1/2001 | Tehrani et al. | |
| 6,209,646 B1 | 4/2001 | Reddy et al. | 166/300 |
| 6,234,251 B1 | 5/2001 | Chatterji et al. | 166/293 |
| 6,258,757 B1 | 7/2001 | Sweatman et al. | 507/219 |
| 6,271,181 B1 | 8/2001 | Chatterji et al. | 507/219 |
| 6,297,202 B1 | 10/2001 | Chatterji et al. | 507/261 |
| 6,328,106 B1 | 12/2001 | Griffith et al. | 166/295 |
| 6,330,917 B2 | 12/2001 | Chatterji et al. | 166/295 |
| 6,367,550 B1 | 4/2002 | Chatterji et al. | |
| 6,401,817 B1 | 6/2002 | Griffith et al. | 166/295 |
| 6,448,206 B1 | 9/2002 | Griffith et al. | 507/219 |
| 6,503,870 B2 | 1/2003 | Griffith et al. | |
| 6,508,305 B1 | 1/2003 | Brannon et al. | 166/293 |
| 6,508,306 B1 | 1/2003 | Reddy et al. | 166/295 |
| 6,516,884 B1 | 2/2003 | Chatterji et al. | 166/294 |
| 6,518,224 B2 | 2/2003 | Wood | |
| 6,527,051 B1 | 3/2003 | Reddy et al. | 166/300 |
| 6,528,563 B2 | 3/2003 | Kaiser et al. | 524/239 |
| 6,534,449 B1 | 3/2003 | Gilmour et al. | |
| 6,547,871 B2 | 4/2003 | Chatterji et al. | |
| 6,554,071 B1 | 4/2003 | Crook et al. | 166/293 |
| 6,555,507 B2 | 4/2003 | Chatterji et al. | 507/219 |
| 6,561,273 B2 | 5/2003 | Brothers et al. | |
| 6,581,701 B2 | 6/2003 | Heying | 175/72 |
| 6,593,402 B2 | 7/2003 | Chatterji et al. | 524/7 |
| 6,641,660 B1 | 11/2003 | Chatterji et al. | 106/724 |
| 6,645,288 B1 | 11/2003 | Dargaud et al. | 106/696 |
| 6,668,928 B2 | 12/2003 | Brothers | 166/292 |
| 6,702,021 B1 | 3/2004 | Nguyen et al. | 166/295 |
| 6,702,044 B2 | 3/2004 | Reddy et al. | 175/64 |
| 6,715,568 B1 | 4/2004 | Bailey | 175/72 |
| 6,722,433 B2 | 4/2004 | Brothers et al. | 166/288 |
| 6,729,405 B2 | 5/2004 | DiLullo et al. | |
| 6,742,592 B1 | 6/2004 | Le Roy-Delage et al. | 166/293 |
| 6,823,940 B2 | 11/2004 | Reddy et al. | 166/295 |
| 6,832,651 B2 | 12/2004 | Ravi et al. | 166/292 |
| 6,837,316 B2 | 1/2005 | Reddy et al. | 175/64 |
| 6,881,708 B2 | 4/2005 | Reddy et al. | |
| 6,887,833 B2 | 5/2005 | Brothers et al. | |
| 6,902,001 B2 | 6/2005 | Dargaud et al. | |
| 6,926,081 B2 | 8/2005 | Sweatman et al. | |
| 6,957,702 B2 | 10/2005 | Brothers et al. | |
| 6,962,201 B2 | 11/2005 | Brothers | |
| 7,007,755 B2 | 3/2006 | Reddy et al. | |
| 7,143,828 B2 | 12/2006 | Reddy et al. | |
| 7,172,022 B2 | 2/2007 | Reddy et al. | |
| 7,213,645 B2 | 5/2007 | Sweatman et al. | |
| 2003/0036484 A1 | 2/2003 | Kirsner et al. | 507/118 |
| 2003/0064897 A1 | 4/2003 | Kirsner et al. | 507/100 |
| 2004/0007360 A1 | 1/2004 | Leroy-Delage et al. | 166/293 |
| 2004/0040712 A1 | 3/2004 | Ravi et al. | 166/293 |
| 2004/0055748 A1 | 3/2004 | Reddy et al. | 166/293 |
| 2004/0069538 A1 | 4/2004 | Reddy et al. | 175/72 |
| 2004/0108141 A1 | 6/2004 | Reddy et al. | 175/65 |
| 2004/0144537 A1 | 7/2004 | Reddy et al. | 165/292 |
| 2004/0152603 A1 | 8/2004 | Kirsner et al. | 507/100 |
| 2004/0168798 A1 | 9/2004 | Creel et al. | 166/270 |
| 2004/0168802 A1 | 9/2004 | Creel et al. | 166/293 |
| 2004/0168804 A1 | 9/2004 | Reddy et al. | 166/295 |
| 2004/0171499 A1 | 9/2004 | Ravi et al. | 507/200 |
| 2004/0180794 A1 | 9/2004 | Reddy et al. | |
| 2004/0198872 A1 | 10/2004 | Reddy et al. | 524/3 |
| 2005/0061206 A1 | 3/2005 | Reddy et al. | |
| 2005/0080176 A1 * | 4/2005 | Robb | 524/424 |
| 2005/0113262 A1 | 5/2005 | Ravi et al. | |
| 2005/0230112 A1 | 10/2005 | Reddy et al. | |
| 2006/0289165 A1 | 12/2006 | Smith et al. | |
| 2007/0111900 A1 | 5/2007 | Reddy et al. | |
| 2007/0111901 A1 | 5/2007 | Reddy et al. | |
| 2007/0287639 A1 | 12/2007 | Reddy et al. | |

FOREIGN PATENT DOCUMENTS

| | | |
|---|---|---|
| FR | 2780752 A1 | 1/2000 |
| GB | 2 271 350 A | 4/1994 |
| JP | 2001146457 | 5/2001 |
| WO | WO 2004/101463 | 11/2004 |
| WO | WO 2004/101951 A1 | 11/2004 |
| WO | WO 2004/101952 A1 | 11/2004 |

OTHER PUBLICATIONS

Baroid brochure entitled "Baracarb® Bridging Agent" dated 2000.

Halliburton brochure entitled "Bentonite Diesel Oil Slurry (BDO) Lost-Circulation Material" dated 2000.

Halliburton brochure entitled "CFR-2 Cement Friction Reducer" dated 1999.

Halliburton brochure entitled "CFR-3™ Cement Friction Reducer Dispersant" dated 2004.

Halliburton brochure entitled "D-AIR 3000 and D-AIR 3000L Defoamers" dated 1999.

Baroid brochure entitled "Diamond Seal™ Absorbent Polymer for Lost Circulation" dated 1999.

Halliburton brochure entitled "Diesel-Oil Cement Water-Control System" dated 1999.

Halliburton brochure entitled "DOC-3 Surfactant" dated 1999.

Baroid brochure entitled "Driltreat® Oil Wetting Agent" dated 2002.

Halliburton brochure entitled "Econolite Additive For Cement Slurries" dated 1998.

Baroid brochure entitled "EZ MUL® NT Emulsifier" dated 2004.

Halliburton brochure entitled "Cementing FlexPug® OBM Lost-Circulation Material" dated 2004.

Halliburton brochure entitled "FlexPlug$^{SM}$ Service Stop Lost Circulation, Hold Your Bottom Line" dated 1998.

Halliburton brochure entitled "FlexPlug® W Lost-Circulation Material" dated 2004.

Halliburton brochure entitled "Flo-Chek® Service Lost-Circulation Service" date 2000.

Halliburton Services brochure entitled "HydroChek Service—MOC/One Slurry for Selective Water Control" undated.

Baroid brochure entitled "Hydro-Plug™ Lost Circulation Material" dated 2002.

Baroid brochure entitled "Hydro-Plug™ Lost Circulation Plug" dated 2002.

Halliburton brochure entitled "Latex 2000 Cement Additive" dated 1998.

Halliburton brochure entitled "Stabilizer 434B Latex Stabilizer" dated 1999.

Halliburton brochure entitled "Stabilizer 434C Surfactant" dated 1998.

Baroid brochure entitled "SteelSeal™ Lost Circulation Material" dated 2002.

Baroid borchure entitled "SteelSeal Fine™ Lost Circulation Material" dated 2002.

Halliburton brochure entitled "StrataLock™ Wellbore/Formation Stablilization System" dated 2003.

Halliburton brochure entitled "Increased Integrity with the StrataLock Stabilization System" dated 1998.

Dow Reichold Specialty Latex LLC product bulletin entitled "TYCHEM® 68710-00" printed from the internet on Nov. 30, 2004.
Dow Reichold Specialty Latex LLC material safety data sheet for "TYCHEM® 68710-00" printed from the internet on Nov. 30, 2004.
Halliburton brochure entitled "VeraSet™ Cementing System" dated 1996.
SPE 24330 paper entitled "A Selective Water Control Process" by E.D. Dalrymple et al., dated 1992.
Halliburton brochure entitled "Halad®-447 Fluid-Loss Additive" dated 1999.
Halliburton brochure entitled "LA-2 Latex Fluid-Loss Additive" dated 1999.
Halliburton brochure entitled Silicalite Cement Additive dated 1999.
Foreign communication from a related counterpart application dated Apr. 13, 2006.
Advisory Action dated Apr. 12, 2007 (2 pages), U.S. Appl. No. 11/827,022, filed on Apr. 19, 2004.
Advisory Action dated Dec. 14, 2007 (3pages), U.S. Appl. No. 10/827,022, filed on Apr. 19, 2004.
Advisory Action dated Mar. 19, 2007 (3 pages), U.S. Appl. No. 11/827,022, filed on Apr. 19, 2004.
Foreign communication from a counterpart application—International Search Report and Written Opinion, PCT/GB2005/001385, Jul. 26, 2005, 9 pages.
Office Action dated Jun. 13, 2006 (5 pages), U.S. Appl. No. 10/827,022, filed on Apr. 19, 2004.
Office Action dated Aug. 7, 2006 (16 pages), U.S. Appl. No. 10/827,022, filed on Apr. 19, 2004.
Office Action dated Jan. 17, 2007 (9 pages), U.S. Appl. No. 10/827,022, filed on Apr. 19, 2004.
Office Action dated May 16, 2007 (8 pages), U.S. Appl. No. 10/827,022, filed on Apr. 19, 2004.
Office Action dated Oct. 12, 2007 (9 pages), U.S. Appl. No. 10/827,022, filed on Apr. 19, 2004.
Claytone® II—Organophilic Bentonite Product Bulletin, http://www.claytone.net/bulletins/CLAY-II.htm, Apr. 15, 2005, 5 pages.

Halliburton brochure entitled "D-AIR 3000 and D-AIR 3000L Defoamers," 1999, 2 pages, Halliburton Energy Services, Inc., (month unavailable).
Halliburton brochure entitled "FlexPlug® W Lost-Circulation Material," Aug. 2004, 2 pages, Halliburton.
Halliburton brochure entitled "Latex 2000 Cement Additive," 1998, 2 pages, Halliburton Energy Services, Inc., (month unavailable).
Halliburton brochure entitled "Stabilizer 434B Latex Stabilizer," 1999, 2 pages, Halliburton Energy Services, Inc., (month unavailable).
Halliburton brochure entitled "Stabilizer 434C Surfactant," 1998, 2 pages, Halliburton Energy Services, Inc., (month unavailable).
Halliburton brochure entitled "The PermSeal™ System," Mar. 2002, 2 pages, Halliburton.
Halliburton brochure entitled "DrillAhead® Services," 2004, 1 page, Halliburton., (month unavailable).
Halliburton Material Saftey Data Sheet entitled "InverMul® RF system with Baracarb®," Aug. 22, 2002, pp. 1-7, Halliburton.
Halliburton Material Safety Data Sheet entitled "InverMul® RF system with Barodense®," Aug. 22, 2002, pp. 1-7, Halliburton.
Halliburton Material Safety Data Sheet entitled "InverMul® RF system with Baroid®," Aug. 22, 2002, pp. 1-7, Halliburton.
Office Action dated Aug. 20, 2007 (21 pages), U.S. Appl. No. 11/270,986, filed on Nov. 11, 2005.
Office Action dated Dec. 26, 2007 (14 pages), U.S. Appl. No. 11/270,986, filed on Nov. 11, 2005.
Office Action dated Mar. 5, 2008 (19 pages), U.S. Appl. No. 10/827,022, filed on Apr. 19, 2004.
Office Action dated May 16, 2008 (8 pages), U.S. Appl. No. 11/270,986, filed on Nov. 11, 2005.
Office Action dated May 28, 2008 (29 pages), U.S. Appl. No. 11/271,174, filed on Nov. 11, 2005.
Schlumberger Oilfield Glossary, "gyp mud" definition, http://www.glossary.oilfield.slb.com/Display.cfm?Term=gyp%20mud, May 23, 2008, 1 page, Schlumberger Limited.
Encyclopedia of Polymer Science and Engineering, vol. II, Second Edition, pp. 45-95, (copyright 1988—month unavailable).

* cited by examiner

OILWELL SEALANT COMPOSITIONS COMPRISING ALKALI SWELLABLE LATEX

BACKGROUND OF THE INVENTION

This invention relates to the field of sealant compositions and more specifically to sealant compositions comprising alkali swellable latex and a pH increasing material as well as methods for using such compositions to service a wellbore.

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (e.g., sheath) to thereby attach the string of pipe to the walls of the wellbore and seal the annulus. Subsequent secondary cementing operations may also be performed. One example of a secondary cementing operation is squeeze cementing whereby a cement slurry is employed to plug and seal off undesirable flow passages in the cement sheath and/or the casing. While a cement slurry is one type of sealant composition used in primary and secondary cementing operations, other non-cement containing sealant compositions may also be employed.

Latex emulsions, which contain a stable water-insoluble, polymeric colloidal suspension in an aqueous solution, are commonly used in sealant compositions to improve the properties of those compositions. For example, latex emulsions are used in cement compositions to reduce the loss of fluid therefrom and to reduce the gas flow potential of the composition as the compositions are being pumped to the annulus. Latex emulsions are also employed to reduce the brittleness of the sealant compositions; otherwise, the compositions may shatter under the impacts and shocks generated by drilling and other well operations. Such sealant compositions may be used for sealing the junction of multilateral wells. In addition, latex emulsions are used to improve the flexibility of sealant compositions.

Moreover, latex emulsions are also mixed with drilling fluids, particularly the non-aqueous type, near loss-circulation zones such as natural or induced fractures, thereby forming solid masses for sealing those zones to prevent the drilling fluids from being lost during drilling.

Drawbacks to using latex emulsions include a lack of sufficient strength and elasticity. For instance, sealant compositions containing latex emulsions may be unable to withstand fluid pressures imposed upon the emulsion by drilling operations. Therefore, there are needs for a latex emulsion having increased resistance to downhole fluid pressures.

BRIEF SUMMARY OF SOME OF THE PREFERRED EMBODIMENTS

These and other needs in the art are addressed in one embodiment by a method of servicing a wellbore in contact with a subterranean formation. The method comprises placing an alkali swellable latex and a pH increasing material in the wellbore to form a sealant composition. In an embodiment, the method comprises contacting the subterranean formation with sealant compositions comprising alkali swellable latex.

In other embodiments, such needs are addressed by a method of increasing the viscosity of a sealant composition. The method comprises introducing an alkali swellable latex and a pH increasing material to a wellbore. In addition, the method comprises contacting the alkali swellable latex with the pH increasing material to form the sealant composition. The pH increasing material increases the viscosity of the sealant composition by reacting with the alkali swellable latex.

In further embodiments, such needs are addressed by a sealant composition for use in a wellbore. The sealant composition comprises an alkali swellable latex and a pH increasing material. The sealant composition has a pH of from about 7 to about 14.

In other embodiments, the pH increasing material comprises a base-producing material that is capable of increasing the pH of an aqueous solution above about 7. The base-producing material can include alkali and alkali earth metal carbonates, alkali and alkali earth metal bicarbonates, alkali and alkali earth metal hydroxides, alkali and alkali earth metal oxides, alkali and alkali earth metal phosphates, alkali and alkali earth metal hydrogen phosphates, alkali and alkaline earth metal sulphides, alkali and alkaline earth metal salts of silicates, alkali and alkaline earth metal salts of aluminates, water soluble or water dispersible organic amines, polymeric amines, amino alcohols, hydraulic cements such as Portland cements or combinations thereof. Further embodiments include a sealant composition having a pH of from about 8 to about 13.

The sealant composition comprising an alkali swellable latex and a pH increasing material overcomes problems in the art such as lack of sufficient strength and elasticity with conventional plugging compositions. For instance, the sealant composition can withstand higher downhole pressures than conventional plugging compositions.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily used as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
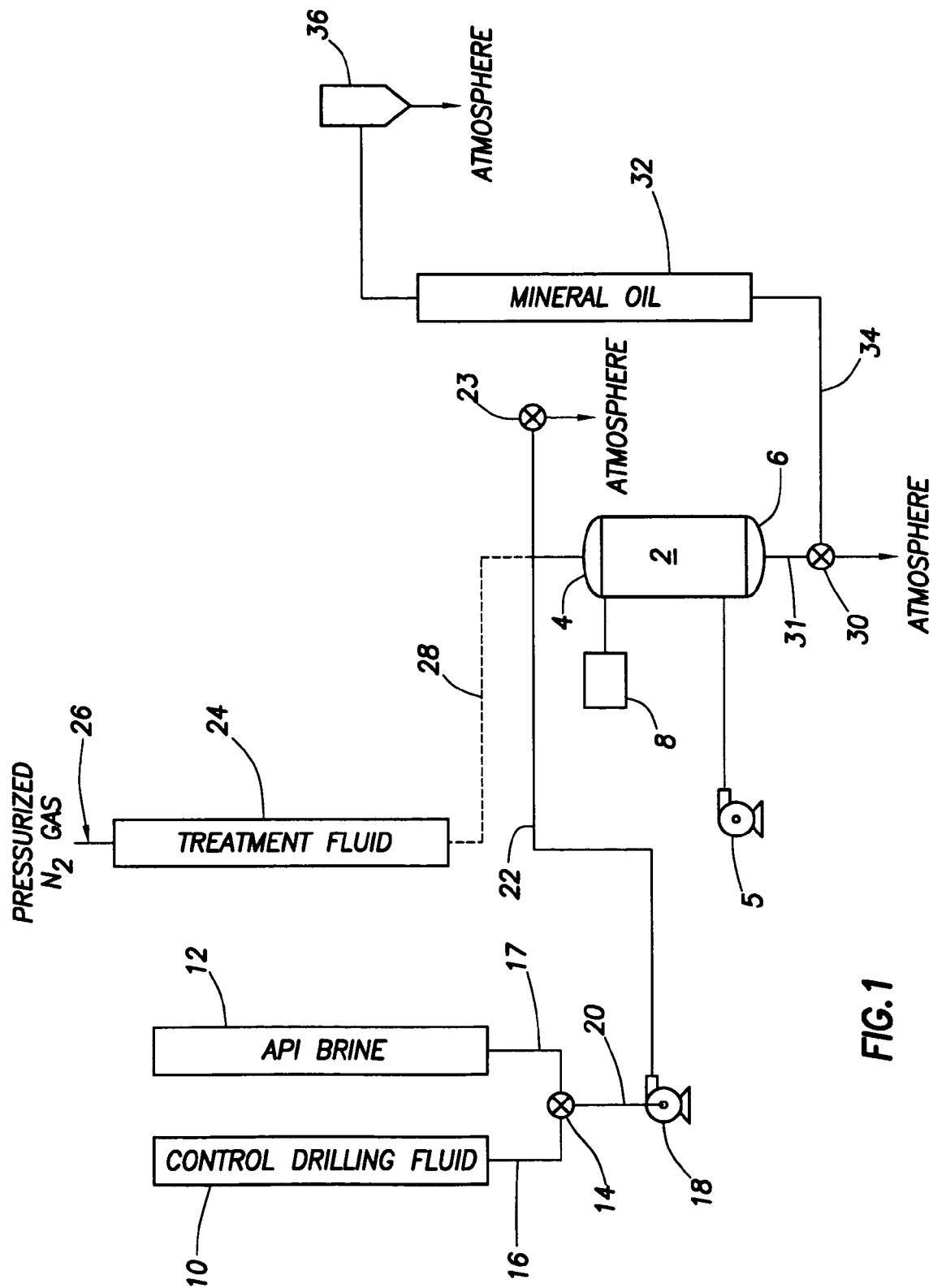
FIG. 1 illustrates a test procedure for applying pressure from a drilling fluid to a sealant composition.

In an embodiment, a sealant composition having an increased pH comprises alkali swellable latex and at least one pH increasing material. The sealant composition is a mixture that can viscosify in wellbore zones where a fluid (e.g., drilling fluid) is being lost. For instance, the sealant composition may viscosify in a loss-circulation zone and thereby restore circulation. The viscosified mixture can set into a flexible, resilient and tough material, which may prevent further fluid losses when circulation is resumed. The pH increasing material is a compound capable of increasing the pH of the sealant composition to about 7 or higher. The pH increasing material can be a base-producing material, a cement, or combinations thereof. Without being limited by theory, it is believed that the pH increasing material reacts with acidic groups in the alkali swellable latex and thereby increases its viscosity along with that of the resulting sealant composition. In one embodiment, the pH of the sealant composition is increased at a desired time by using an encapsulated base having a suitable coating composition for delayed release, which may be triggered by conditions such as changes in temperature, mechanical stresses or the chemical makeup of the final downhole mixture.

The sealant composition can further comprise additives for improving or changing its properties. Examples of suitable additives include fluid absorbing materials, particulate materials, superabsorbers, viscosifying agents, non-alkali swellable latexes, or combinations thereof. In an alternative embodiment, the sealant composition is a compressible sealant composition comprising foaming surfactants and foam stabilizing surfactants.

The sealant composition is for use in a wellbore that penetrates a subterranean formation. It is to be understood that "subterranean formation" encompasses both areas below exposed earth and areas below earth covered by water such as ocean or fresh water. The sealant composition can be used for any purpose. For instance, the sealant composition can be used to service the wellbore. Without limitation, servicing the wellbore includes positioning the sealant composition in the wellbore to isolate the subterranean formation from a portion of the wellbore; to support a conduit in the wellbore; to plug a void or crack in the conduit; to plug a void or crack in a cement sheath disposed in an annulus of the wellbore; to plug an opening between the cement sheath and the conduit; to prevent the loss of aqueous or non-aqueous drilling fluids into loss circulation zones such as a void, vugular zone, or fracture; to be used as a fluid in front of cement slurry in cementing operations; and to seal an annulus between the wellbore and an expandable pipe or pipe string.

"Alkali swellable latex" is defined as a latex emulsion that, when exposed to pH increasing materials, may swell and exhibit an increase in viscosity. Such pH increasing materials may be present and/or added to the latex emulsion. Alkali swellable latexes typically contain, in addition to the typical latex forming monomers, monomers having acidic groups capable of reacting with pH increasing materials thereby forming anionic pendant groups on the polymer back bone. Alkali swellable latex emulsions, due to the presence of acidic groups, have a pH in the range of from about 2 to about 8 and are predominantly low viscosity fluids with viscosities less than about 100 centipoise for an emulsion containing 30% solids. When the pH is increased by the addition of a pH increasing material, the viscosity increase may be in the range of from about five times to more than about a million times for a 30% emulsion. The conventional latex emulsion does not significantly increase in viscosity upon the addition of a pH increasing material. In some embodiments, the latex emulsion may be cross-linked during the polymerization phase of the monomers. Examples of typical latex forming monomers that may be used to make alkali swellable latexes include, without limitation, vinyl aromatic monomers (e.g., styrene based monomers), ethylene, butadiene, vinylnitrile (e.g., acrylonitrile), olefinically unsaturated esters of $C_1$-$C_8$ alcohol, or combinations thereof. In some embodiments, non-ionic monomers that exhibit steric effects and that contain long ethoxylate or hydrocarbon tails may also be present. The monomers containing acid groups capable of reacting with pH increasing materials include ethylenically unsaturated monomers containing at least one carboxylic acid functional group. Such carboxylic acid containing monomers may be present in the range of from about 5 to about 30% by weight of the total monomer composition used in preparing the alkali swellable latex. Without limitation, examples of such carboxylic acid containing groups include acrylic acid, alkyl acrylic acids, such as methacrylic acid and ethacrylic acid, alpha-chloro-acrylic acid, alpha-cyano acrylic acid, alpha-chloro-methacrylic acid, alpha-cyano methacrylic acid, crotonic acid, alpha-phenyl acrylic acid, beta-acryloxy propionic acid, sorbic acid, alpha-chloro sorbic acid, angelic acid, cinnamic acid, p-chloro cinnamic acid, beta-styryl acrylic acid (1-carboxy-4-phenyl butadiene-1,3), itaconic acid, maleic acid, citraconic acid, mesaconic acid, glutaconic acid, aconitic acid, fumaric acid, tricarboxy ethylene, or combinations thereof. In an embodiment, the carboxylic acid containing groups can include itaconic acid, acrylic acid, or combinations thereof.

The preparation of such alkali swellable latexes is discussed in U.S. Pat. Nos. 3,793,244; 4,861,822; and 5,563,201, which are incorporated herein by reference in their entirety. In one embodiment, the sealant composition includes an alkali swellable latex comprising a styrene/butadiene/acrylic or itaconic acid terpolymer latex emulsion prepared by emulsion polymerization. The emulsion can be a colloidal dispersion of the copolymer. The colloidal dispersion includes water from about 40 to about 70% by weight of the emulsion. In addition to the dispersed copolymer, the alkali swellable latex may include an emulsifier, polymerization catalysts, chain modifying agents, emulsion stabilizing agents, resins, crosslinking agents, and the like.

Without limitation, examples of suitable commercially available alkali swellable latexes include TYCHEM 68710 of Dow Reichhold Specialty Latex LLC; ACRYSOL TT 615 of Rohm and Haas; SN THICKENERs 920, 922, 924, 634 and 636 of San Napco Limited, Sanyo Chemical Industry, Japan; ALCOGUM SL-120 of Alco Chemical, a National Starch Company; HEUR-ASE P206 of Dow Chemical Company; ADCOTE 37-220 of Rohm and Haas Company; and JETSIZE AE-75 of Eka Chemicals. TYCHEM 68710 is a carboxylated styrene/butadiene copolymer suspended in a 45% to 55% by weight aqueous emulsion. JETSIZE AE-75 is a styrene acrylate emulsion.

In other embodiments, the alkali swellable latex may contain crosslinking agents that are suitable for facilitating the formation of a resilient rubbery mass, which may be used during the polymerization stage of the monomers or added to the latex prior to use (for example to the sealant composition). In embodiments wherein the alkali swellable latex contains vulcanizable groups such as the diene type of monomers, crosslinking agents including vulcanizing agents such as sulfur, 2,2'-dithiobisbenzothiazole, organic peroxides, azo compounds, alkylthiuram disulfides, selenium phenolic derivatives and the like; vulcanization accelerators such as fatty acids (e.g,. stearic acid), metallic oxides (e.g., zinc oxide), aldehyde amine compounds, guanidine compounds, disulfide thiuram compounds, and the like; vulcanization retarders such as salicylic acid, sodium acetate, phthalic anhydride and N-cyclohexyl thiophthalimide; defoamers; or combinations thereof may be added just prior to use, for instance to a sealant composition. Such compositions are discussed in U.S. Pat. No. 5,293,938, which is incorporated by reference herein in its entirety. If the crosslinking agent is used during production of the latex, it may be a multifunctional monomer with more than one polymerizable group for example divinylbenzene, trimethylolpropane triacrylate, tetraethyleneglycol diacrylate, methylene bisacrylamide and the like.

The alkali swellable latex may comprise from about 0.1 to about 5 wt. % crosslinking agents by weight of the monomers, alternatively from about 0.2 to about 1 wt. % crosslinking agents by weight of the monomers.

A base-producing material includes any compound capable of generating hydroxyl ions (OH−) in water to react with or neutralize an acid to from a salt. In one embodiment, the base-producing material has at least partial solubility in water, for example a solubility of 1% or greater in water. Examples of suitable base-producing materials include without limitation ammonium, alkali and alkali earth metal carbonates and bicarbonates, alkali and alkali earth metal hydroxides, alkali and alkali earth metal oxides, alkali and alkali earth metal phosphates and hydrogen phosphates, alkali and alkaline earth metal sulphides, alkali and alkaline earth metal salts of silicates and aluminates, water soluble or water dispersible organic amines, polymeric amines, amino alcohols, or combinations thereof. Without limitation, examples of suitable alkali and alkali earth metal carbonates and bicarbonates include $Na_2CO_3$, $K_2CO_3$, $CaCO_3$, $MgCO_3$, $NaHCO_3$, $KHCO_3$, ethanolamine and triethanolamine. It is to be understood that when carbonate and bicarbonate salts are used as base-producing material, a byproduct may be carbon dioxide, which may enhance the mechanical properties of the non-cement based sealant composition. Examples of suitable alkali and alkali earth metal hydroxides include without limitation NaOH, $NH_4OH$, KOH, LiOH, and $Mg(OH)_2$. Examples of suitable alkali and alkali earth metal oxides include without limitation BaO, SrO, $Li_2O$, CaO, $Na_2O$, $K_2O$, and MgO. Examples of suitable alkali and alkali earth metal phosphates and hydrogen phosphates include without limitation $Na_3PO_4$, $Ca_3(PO_4)_2$, $CaHPO_4$, and $KH_2PO_4$. Examples of suitable alkali and alkaline earth metal sulphides include without limitation $Na_2S$, CaS, SrS, and the like. Suitable silicate salts include without limitation sodium silicate, potassium silicate and sodium metasilicate. Examples of suitable aluminate salts include without limitations sodium aluminate and calcium aluminate. Examples of commercial silicates include FLO-CHECK and ECONOLITE available from Halliburton Energy Services, Inc. Examples of commercial alkali metal aluminates include sodium aluminate available as VERSASET from Halliburton Energy Services, Inc. Examples of organic amines include without limitation polymeric amines, monomeric amines containing one or more amine groups, and oligomeric amines. The organic amines may be completely or partially soluble in water. The organic amines may also be dissolved in an organic fluid such as those used as base oils in non-aqueous drilling fluids such as hydrocarbons and esters. Examples of suitable water soluble or water dispersible amines include triethylamine, aniline, dimethylaniline, ethylenediamine, diethylene triamine, cyclohexylamine, diethyltoluene diamine, 2,4,6-tri-dimethylaminomethylphenol, isophoroneamine, and the like. Commercial examples of the organic amines include STRATALOCK D, STRATALOCK E and STRATALOCK B from Halliburton Energy Services, Inc.; JEFFAMINE from Huntsman Corp., Austin, Tex.; and EH-101, EH-102, EH-103 and EH-104 from Applied Poleramic, Bernicia, Calif. In an embodiment, the organic amine is dissolved in a non-aqueous fluid, for example a drilling fluid, and contacted with the composition containing the alkali swellable latex. Examples of suitable polymeric amines include chitosan, polylysine, poly(dimethylaminoethylmethacrylate), poly(ethyleneimine), poly(vinylamine-co-vinylalcohol), poly(vinylamine) and the like. Commercial examples of poly(ethyleneimine) include LUPAMIN products from BASF AG Corporation, Ludwigshafen, Germany. Commercial examples of chitosan include CHITOCLEAR of Primex/Vanson Halosource, Redmond, Va. Formylated poly(vinylamine)s are commercially available from BASF AG Corporation as LUPAMIN, for example LUPAMIN 1500. Examples of amino alcohols include ethanolamine, triethanolamine, tripropanolamine and the like.

A sufficient amount of the base-producing material can be contacted with the alkali swellable latex to provide a sealant composition having a pH of from about 7 to about 14. In alternative embodiments, the base-producing material can be contacted with the alkali swellable latex to provide a sealant composition having a pH of from about 8 to about 13. In other alternative embodiments, the base-producing material can be contacted with the alkali swellable latex to provide a sealant composition having a pH of from about 9 to about 13. It is to be understood that the base-producing material can include chemicals that produce a base when reacted together. Without limitation, examples include reaction of an oxide with water. For instance, NaOH can be produced by the following reaction:

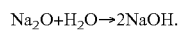

$$Na_2O+H_2O \rightarrow 2NaOH.$$

In one embodiment, the base-producing material is a drilling fluid with a suitable pH in the range of from about 7 to about 14. An example of a high pH drilling fluid is a silicate salt based drilling fluid.

In other embodiments, the base-producing material may comprise a resin such as thermosetting resins. Examples of suitable thermosetting resins include but are not limited to amino resins such as melamine-formaldehyde resins and urea-formaldehyde resins, phenolic resins such as phenol formaldehyde resins, furfural resins, or combinations thereof. With the amino resins, acid catalysts such as ammonium salts or organic acids such as p-toluene sulfonic acids may be used. Due to the acidic nature of the alkali swellable latex and the basic nature of amino resins, the amino resin can function as a base-producing material to swell the latex and in the process become polymerized to form a thermoset polymer, thus imparting additional strength to the sealant composition for example in loss-circulation treatments. To prevent undesired premature swelling and polymerization, the latex and amino resin are pumped separately and allowed to contact in the desired zone downhole. The resin compositions with traditional latexes and methods are discussed in U.S. Pat. No. 6,508,306, which is incorporated by reference herein in its entirety.

In some embodiments, catalyst may be added to the composition containing the alkali-swellable latex to control the cure rate. Acidic or basic catalysts may be used to cure the phenolic resins depending on the resin compositions. When phenolic resin compositions ("Novalac Resins") require acid catalysts, the alkali swellable latex may function as the acid catalyst and become neutralized in the process resulting in the formation swollen latex mass. When the phenolic resins require basic catalysts ("Resole Resins") for cure, the pH increasing may allow the latex to swell as well as catalyze the cure of the phenolic resins. The curing of phenolic resins to form hard thermoset polymers is discussed in the "Encyclopedia of Polymer Science and Engineering", Second Edition (1998), John Wiley and Sons Publishers, pp-45-95.

The furfural resins are typically acid catalyzed and may be catalyzed by the acidic alkali swellable latex or with acid catalysts including but not limited to organic and inorganic acid anhydrides, ammonium salts, sodium bisulfate, hydrolyzable esters such as butyl acetate, furfuryl acetate, organic acids such as maleic acid, fumaric acid, inorganic acids such as phosphoric or sulfonic acid, or combinations thereof. In an embodiment, the acid catalysts include organic acids, sodium bisulfate, or combinations thereof. In other embodiments, the acid catalysts include sodium bisulfate. The amount of such curing agents in a sealant composition ranges from about 0.01% to about 10% by weight of the sealant composition, alternatively from about 1% to about 3% by weight of the sealant concentration.

Phenol formaldehyde resins and furfural resins are commercially available from several sources, for example Durez Corporation of Dallas, Tex. The resins, the alkali swellable latex, and the associated catalysts are allowed to contact in the zone of interest so that viscosification and curing takes place in the desired location downhole.

In some embodiments, the resins and latex may be crosslinked with each other, for instance when amino resins such as melamine- or urea-formaldehyde are used under the cure conditions employed.

In an embodiment, the pH increasing material such as a base-producing compound can be encapsulated with at least one encapsulating material. Without being limited by theory, the base-producing compound may be encapsulated to delay its reaction with the alkali swellable latex and to postpone the formation of a higher viscosity swollen latex product. It is to be understood that the base-producing material can be a liquid for example an aqueous solution or an organic liquid, or a solid. If the base-producing material comprises an aqueous solution, it may be encapsulated in a particulate porous solid material. The particulate porous solid material comprises any suitable material that remains dry and free flowing after absorbing the aqueous solution and through which the aqueous solution slowly diffuses. Examples of particulate porous solid materials include but are not limited to diatomaceous earth, zeolites, silica, expanded perlite, alumina, metal salts of alumino-silicates, clays, hydrotalcite, styrene divinylbenzene based materials, cross-linked polyalkylacrylate esters, cross-linked modified starches, natural and synthetic hollow fibers, porous beads such as perlite beads, or combinations thereof. If the base producing material is an organic liquid, it may also be encapsulated in hydrophobically modified porous silica in addition to the afore-mentioned absorbents.

In alternative embodiments, encapsulation further includes an external coating of a polymer material through which an aqueous solution diffuses and that is placed on the particulate porous solid material. Without being limited by theory, the external coating can be added to further delay the reaction. Examples of external coatings include but are not limited to EDPM rubber, polyvinyldichloride, nylon, waxes, polyurethanes, cross-linked partially hydrolyzed acrylics, cross-linked latex, styrene-butadiene rubber, cross-linked polyurethane and combinations thereof. Encapsulation is described in U.S. Pat. Nos. 5,373,901; 6,527,051; 6,554,071; and 6,209,646, which are incorporated by reference herein in their entirety.

In other embodiments, when the base-producing compound comprises a solid, it can be encapsulated by spray coating a variety of materials thereon, including but not limited to a wax, a drying oil such as tung oil and linseed oil, a polyurethane, a crosslinked partially hydrolyzed polyacrylic, a styrene-butadiene latex, a water degradable compound or polymer, or combinations thereof.

In embodiments wherein the pH increasing material comprises cement, the cement composition can include hydraulic cements. In some embodiments, the hydraulic cements set and harden by reaction with water. The hydraulic cements can be composed of calcium, aluminum, silicon, oxygen, sulfur, or combinations thereof. Without limitation, examples of suitable hydraulic cements include Portland cements (e.g., classes A, C, G, and H Portland cements), pozzolana cements, gypsum cements, phosphate cements, high alumina content cements, silica cements, high alkalinity cements, Magnesia cements, and combinations thereof. Suitable median cement particle sizes are in the 1 to 200 microns range, alternatively 5 to 150 microns, and alternatively 10 to 120 microns range.

A sufficient amount of fluid is added to the cement to form a pumpable cement composition slurry. The fluid may be fresh water or salt water, e.g., an unsaturated aqueous salt solution or a saturated aqueous salt solution such as brine or seawater, or a non-aqueous fluid. The cement composition can be contacted with the alkali swellable latex in sufficient amounts to produce a sealant composition having a pH of from about 7 to about 14. In alternative embodiments, the cement composition can be contacted with the alkali swellable latex in sufficient amounts to produce a sealant composition having a pH of from about 8 to about 13. In other alternative embodiments, the cement composition can be contacted with the alkali swellable latex in sufficient amounts to produce a sealant composition having a pH of from about 9 to about 13.

When suitable non-aqueous fluids such as diesel and kerosene are added to the cement to form a pumpable slurry, some cement surfactants may be used in suitable amounts to assist in the water wetting and hydration of the cement particles upon exposure to water. Examples of suitable cement surfactant systems include imidazole fatty acid condensates and salts of dodecybenzene sulfonic acid. Such suitable cement surfactants are available from Halliburton Energy Services, Inc. of Duncan, Okla., as MOC-ONE and DOC-3. Such cement slurries in non-aqueous fluids are allowed to contact an aqueous fluid containing the alkali swellable latex downhole in the zone of interest, for example a loss circulation zone. The cement in the non-aqueous fluid upon contact with the aqueous fluid hydrates quickly as well as increases the pH of the aqueous fluid, thus swelling the latex to form a sealant composition with improved viscosity and strength to the sealant composition.

In some embodiments, the pH increasing material comprises a low pH cement composition (for example a high alumina cement) and a base-producing material. In such embodiments, an effective amount of cement composition and base-producing material can be contacted with the alkali swellable latex to increase the pH of the sealant composition. The cement composition and base-producing material can be contacted with the alkali swellable latex in sufficient amounts to form a sealant composition having a pH of from about 7 to about 14. In alternative embodiments, the cement composition and base-producing material can be contacted with the alkali swellable latex in sufficient amounts to form a sealant composition having a pH of from about 8 to about 13. In other alternative embodiments, the cement composition and base-producing material can be contacted with the alkali swellable latex in sufficient amounts to form a sealant composition having a pH of from about 9 to about 13.

In embodiments wherein the alkali swellable latex is used with hydraulic cement compositions, the alkali swellable latex may provide control of fluid loss from the cement composition into the formation. Otherwise, such fluid loss may result in less water than desired for cement hydration. In some embodiments, the cement composition may contain from about 0.3 to about 2 wt. % solid latex. In another embodiment, alkali swellable latex may be added to cement formulations to reduce the brittleness of the set cement and otherwise to improve mechanical properties of the set cement to be able to withstand cyclical changes in pressure and temperature during the life of the well. In an embodiment, an amount of alkali swellable latex suitable for improving mechanical properties of cement may be from about 0.5 to about 15% solid latex equivalent by weight of cement. Examples of improved mechanical properties include without limitation increased tensile strength, reduced elastic modulus and reduced brittleness. In another embodiment, when the amounts of solid latex equivalent by weight of cement cannot be delivered by using the aqueous emulsion, the water may be removed from the latex, and the dry solid latex mixed with cement and water to form the slurry.

Surfactants may also be used when alkali swellable latex is added to cement compositions. Without being limited by theory, surfactants may be added to prevent premature gelation of cement slurries, which may render them unpumpable. Such surfactants include ethoxylated nonylphenolsulfonate salts available as STABILIZER 434B and STABILIZER 434C from Halliburton Energy Services, Inc. Other additives that may be added to cement compositions comprising alkali swellable latex include, but are not limited to, densifying materials, light weight additives such as hollow glass or ceramic beads, fly ashes, fumed silica, defoamers, set retarders, set accelerators, and combinations thereof.

In some embodiments, the sealant composition may comprise fluid absorbing materials such as organophilic clay, water swellable clay, a water absorbing mineral, an oil absorbing mineral, or combinations thereof. The fluid absorbing materials react with fluids to increase the viscosity of the sealant composition. Without limitation, examples of organophilic clays include alkyl quaternary ammonium bentonite clay, vermiculite, and hydrophobically modified porous precipitated silica. The amount of organophilic clay present in the sealant composition may be in a range of from about 0.3% to about 30% by weight of the composition. Examples of suitable water swellable clays include but are not limited to montmorillonite clays such as bentonite, attapulgite, Fuller's earth, porous precipitated silica, expanded perlite and vermiculite and combinations thereof. The amount of water swellable clay present in the sealant composition may be in a range of from about 5% to about 60% by weight of the composition. Commercial examples of suitable water or oil absorbing minerals include without limitation perlite, vermiculite, and combinations thereof. Examples of oil absorbing organophilic clays are CLAYTONE products from Southern Clays, Gonzales, Tex., and commercial examples of hydrophobically modified porous silica include SIPERNAT D13 from Degussa Corporation, Frankfurt, Germany.

In some embodiments, the sealant composition comprises particulate materials. As used herein, the term "particulate material(s)" refers to any particles having the physical shape of platelets, shavings, fibers, flakes, ribbons, rods, strips, spheroids, toroids, pellets, tablets, or any other physical shape. The particulate materials may be included in the sealant composition to improve its mechanical properties such as tensile strength, compressive strength, resilience, rigidity, flexibility, and the like. Examples of suitable particulate materials include, but are not limited to, mineral particles, thermoset polymer laminate particles, graphitic carbon-based particles, ground battery casings, ground tires, ground nut shells (e.g., walnut shells, peanut shells, and almond shells), sized-calcium carbonate particles, petroleum coke particles, vitrified shale particles, calcium clay particles, glass particles, mica particles, ceramic particles, polymeric beads, synthetic fibers (e.g., polypropylene fibers), glass fibers, mineral fibers (e.g., basalt, wollastonite, and sepiolite), and combinations thereof. In some embodiments, at least a portion of the thermoset polymer laminate particles are platelets. In other embodiments, the particulate materials include thermoset polymer laminate particles, graphitic-carbon based particles, sized-calcium carbonate particles and combinations thereof. In an embodiment, particulates providing a multimodal particulate material distribution are added to a fluid, for example a drilling fluid, containing PH increasing material and allowed to mix with a second fluid containing the alkali swellable latex and the two fluids are allowed to mix in the zone of interest downhole. In alternative embodiments, the particulates providing the multimodal distribution are added to the fluid containing the alkali swellable latex and allowed to mix with a second fluid, for example a drilling fluid, containing the pH increasing material.

In an embodiment, the sealant composition has a multimodal particulate material distribution. The sealant compositions having a multimodal particle size distribution may have a bimodal particle size distribution, trimodal particle size distribution, or other suitable particle size distribution as desired by one of ordinary skill in the art based, inter alia, on the particular application. In one embodiment, the sealant composition comprises a first portion of particulate material having a weight mean particle size of less than about 20 microns; a second portion of particulate material having a weight mean particle size in the range of from about 25 microns to about 400 microns, and a third portion of particulate material having a weight mean particle size in the range of from about 450 microns to about 1,500 microns. At least about 20% by weight of the sealant composition may be resilient particles, thermoset polymer laminate particles, or combinations thereof. In an embodiment, at least a portion of the thermoset polymer laminate particles are platelets.

Commercial examples of suitable sized-calcium carbonate particles having a weight mean particle size in the range of from about 25 microns to about 400 microns include BARACARB 25 sized-calcium carbonate, BARACARB 50 sized-calcium carbonate, and BARACARB 150 sized-calcium carbonate, which are commercially available from Halliburton Energy Services, Inc. In some embodiments, the graphitic carbon-based particles may comprise graphite and a carbon matrix. In certain embodiments, the graphite may be present in the graphitic carbon-based materials in an amount of at least about 20% by weight and, in other embodiments, in an amount of from about 80% to about 95% by weight. Other examples of suitable thermoset polymer laminate particles include those that comprise melamine formaldehyde or urea-formaldehyde type of thermoset polymers. Commercial examples of melamine-formaldehyde type of thermoset polymer laminates include FORMICA from Formica Corporation and PHENOSEAL ground laminate from Forta Corporation. PHENOSEAL ground laminate is available in Fine, Medium, and Coarse grades. In some embodiments, the Fine Grade material, about 55% by weight of which passes through a 250 micron (60 mesh) screen, is used. The appropriate type and amount of each portion of particles to include in the sealant composition may vary dependent upon a variety of factors known to those skilled in the art, including formation characteristics and conditions, such as circulation loss rates, fracture geometry, and the like. A listing of the materials and their particle size distributions are included in Table I below.

TABLE I

| Particle Type | Mean size (microns) | Size of particles under 10% by volume (microns) | Size of particles under 90% by volume (microns) | Span[1] |
|---|---|---|---|---|
| STEELSEAL | 300 | 145 | 573 | 1.43 |
| BARACARB 150 | 200 | 64 | 404 | 1.69 |
| BARACARB 600 | 670 | 411 | 835 | 6.3 |
| REV DUST | 20 | 2.6 | 63.8 | 3.06 |
| PHENOSEAL | Particle sizes for the PHENOSEAL ground laminate were beyond the measuring ability of the Particle Size Analyzer. | | | |

[1]Span is a measure of particle size distribution.

In other embodiments, the first, the second or the third portion of particulate materials may comprise resilient particles. For example, a desired portion of particles may comprise a resilient graphitic carbon-based material. Graphitic carbon-based materials generally are considered resilient if they have a resiliency of at least about 20% after compression at 10,000 psi. As used herein, the term "resiliency" refers to the percentage increase in sample volume after release of a compaction pressure and is defined by the following formula:

$$\% \text{ Resiliency} = 100\left(\frac{h_r}{h_o} - 1\right)$$

wherein $h_o$ is the height of a column of the material being tested under the compaction pressure, and $h_r$ is the height of the column of the material being tested after the compaction pressure is released. An exemplary resiliency test procedure is described in U.S. Pat. No. 5,826,669, the relevant disclosure of which is incorporated by reference herein.

Commercial examples of suitable resilient carbon-based materials having a weight mean particle size in the range of from about 25 microns to about 400 microns include STEEL-SEAL carbon additive and STEELSEAL FINE carbon additive, which are commercially available from Halliburton Energy Services, Inc. In some embodiments, at least about 30% by weight of the desired portion of particles is resilient particles, thermoset polymer laminate particles, or a combination thereof.

Examples of suitable fibers include but are not limited to mineral fibers such as WOLLASTOCOAT mineral fibers commercially available from NYCO Minerals, Inc. of Willsboro, N.Y. and BAROFIBRE from Halliburton Energy Services, Inc. and glass fibers such as commercially available CEM FIL fibers available from Saint Gobain, Vetrotex of Madrid, Spain.

Sufficient amounts of particulate materials may be added to the sealant composition to improve the effectiveness of the sealant composition in reducing or preventing circulation losses and withstanding increased pressures. In certain embodiments, the particulate materials may be present in the sealant composition in amounts between about 5% to 35% by weight of the sealant composition.

In yet another embodiment, the sealant composition includes superabsorbers. The superabsorbers are introduced to the wellbore with the pH increasing material and an oil-based drilling fluid. Superabsorbers are commonly used in absorbent products such as horticulture products, diapers, training pants, and feminine care products. Superabsorbers are swellable, crosslinked polymers that, by forming a gel, have the ability to absorb and store many times their own weight of aqueous liquids. Superabsorbers retain the liquid that they absorb and typically do not release the absorbed liquid, even under pressure. Examples of superabsorbers include sodium acrylate-based polymers having three dimensional, network-like molecular structures. The polymer chains are formed by the reaction/joining of millions of identical units of acrylic acid monomer, which have been substantially neutralized with sodium hydroxide (caustic soda). Crosslinking chemicals tie the chains together to form a three-dimensional network, which enable the superabsorbers to absorb water or water-based solutions into the spaces in the molecular network and thus form a gel that locks up the liquid. Additional examples of suitable superabsorbers include but are not limited to crosslinked polyacrylamide; crosslinked polyacrylate; crosslinked hydrolyzed polyacrylonitrile; salts of carboxyalkyl starch, for example, salts of carboxymethyl starch; salts of carboxyalkyl cellulose, for example, salts of carboxymethyl cellulose; salts of any crosslinked carboxyalkyl polysaccharide; crosslinked copolymers of acrylamide and acrylate monomers; starch grafted with acrylonitrile and acrylate monomers; crosslinked polymers of two or more of allylsulfonate, 2-acrylamido-2-methyl-1-propanesulfonic acid, 3-allyloxy-2-hydroxy-1-propane-sulfonic acid, acrylamide, and acrylic acid monomers; or combinations thereof. In one embodiment, the superabsorber absorbs not only many times its weight of water but also increases in volume upon absorption of water many times the volume of the dry material.

In an embodiment, the superabsorber is a dehydrated, crystalline (e.g., solid) polymer. In other embodiments, the crystalline polymer is a crosslinked polymer. In an alternative embodiment, the superabsorber is a crosslinked polyacrylamide in the form of a hard crystal. A suitable crosslinked polyacrylamide is the DIAMOND SEAL polymer available from Baroid Drilling Fluids, Inc., a Halliburton Company. The DIAMOND SEAL polymer is available in grind sizes of 1 mm, 4 mm, and 14 mm. The DIAMOND SEAL polymer possesses certain qualities that make it a suitable superabsorber. For example, the DIAMOND SEAL polymer is water-insoluble and is resistant to deterioration by carbon dioxide, bacteria, and subterranean minerals. Further, the DIAMOND SEAL polymer can withstand temperatures up to at least 250° F. without experiencing breakdown and thus may be used in the majority of locations where oil reservoirs are found. An example of a biodegradable starch backbone grafted with acrylonitrile and acrylate is commercially available from Grain Processing Corporation of Muscantine, Iowa under the tradename WATER LOCK.

As mentioned previously, the superabsorber absorbs water and is thus physically attracted to water molecules. In the case where the swelling agent is a crystalline crosslinked polymer, the polymer chain solvates and surrounds the water molecules during water absorption. In effect, the polymer undergoes a change from that of a dehydrated crystal to that of a hydrated gel as it absorbs water. Once fully hydrated, the gel usually exhibits a high resistance to the migration of water due to its polymer chain entanglement and its relatively high viscosity. The gel can plug permeable zones and flow pathways because it can withstand substantial amounts of pressure without being dislodged or extruded.

In an embodiment, the superabsorber has a particle size (i.e., diameter) of greater than or equal to about 0.01 mm, alternatively greater than or equal to about 0.25 mm, alternatively less than or equal to about 14 mm, before it absorbs water (i.e., in its solid form). The use of a superabsorber having this particle size provides a superabsorber that is less likely to migrate deep into the subterranean formation before being contacted with an aqueous solution containing the alkali swellable latex, which may cause it to swell. The flow pathways in the formation thus can be plugged near the surface of the formation more efficiently. Further, the larger particle size of the superabsorber allows it to be paced in permeable zones in the wellbore, which are typically greater than about 1 mm in diameter. As the superabsorber undergoes hydration, its physical size increases by about 10 to 800 times its original weight. The resulting size of the superabsorber is thus of sufficient size to plug flow pathways in the formation and permeable zones in the wellbore so that fluids cannot undesirably migrate therethrough. It is to be understood that the amount and rate by which the superabsorber increases in size may vary depending upon temperature, grain size, and the ionic strength of the carrier fluid. The temperature of a well typically increases from top to bottom such that the rate of swelling increases as the superabsorber passes downhole. The rate of swelling also increases as the particle size of the superabsorber decreases and as the ionic strength of the carrier fluid, as controlled by salts such as sodium chloride or calcium chloride, decreases and vice versa.

The swell time of the superabsorber may be in a range of from less than 5 minutes to about 16 hours, alternatively in a range of from about 1 hour to about 6 hours.

In alternative embodiments, a viscosifying agent is added to the sealant composition to further increase its viscosity and to prevent solid settling. Examples of suitable viscosifying agents include without limitation hydroxyethyl cellulose, hydrophobically modified hydroxyethyl cellulose, guar gum, xanthan gum and the like.

In an embodiment, the sealant composition may include a non-alkali swellable latex. Without limitation, examples of non-alkali swellable latexes include a latex comprising a styrene/butadiene copolymer latex emulsion or suitable elastomeric polymers in aqueous latex form, i.e., aqueous dispersions or emulsions. Without limitation, examples of suitable elastomeric polymers include natural rubber (cis-1,4-polyisoprene), modified types thereof, synthetic polymers, and blends thereof. Without limitation, examples of suitable synthetic polymers include ethylene-acrylic acid ionomers. The ratio of alkali swellable to non-alkali swellable latex may be in the weight ratio of from about 5:95 to about 95:5.

Additives such as defoamers may be added to prevent foaming during mixing. Additives for achieving the desired density such as hollow beads or high density materials such as haemetite and barium sulfate may also be added to the sealant composition. Particulate dispersants such as sulfonated naphthalene formaldehyde condensate (e.g., CFR-2 from Halliburton Energy Services, Inc.), sulfite adducts of acetone-formaldehyde condensate (e.g., CFR-3 from Halliburton Energy Services, Inc.) or sulfonated melamine formaldehyde condensate may also be added.

In alternative embodiments, the sealant composition is a compressible sealant composition comprising alkali swellable latex, a pH increasing material comprising hydraulic cement, a gas, at least one foaming surfactant, and at least one foam stabilizing surfactant. In some embodiments, the pH increasing material further comprises a base-producing material. In an embodiment, the sealant composition is used to seal an expandable pipe or pipe string in a wellbore. Using conventional compressible hydraulic cement sealant compositions to seal expandable pipes is disclosed in U.S. Pat. Nos. 6,722,433 and 6,668,928, which are incorporated by reference herein in their entirety.

In an embodiment wherein an expandable pipe or pipe string is located in a wellbore, the compressible sealant composition is placed in the annulus between the wellbore and the expandable pipe or pipe string. The foamed sealant composition is allowed to harden. The foamed sealant composition compresses upon expanding of the expandable pipe or pipe string.

Various procedures that may be followed to use the sealant composition in a wellbore are described in U.S. Pat. Nos. 5,346,012 and 5,588,488, which are incorporated by reference herein in their entirety.

In one embodiment, the alkali swellable latex and pH increasing material are displaced into the wellbore via separate flowpaths. The pH increasing material, mixed in with the drilling fluid or in a separate inert carrier fluid (e.g., water), can be pumped down the drill pipe, and the alkali swellable latex can be pumped down the annular wellbore space outside the drill pipe in a separate stream. The two streams are allowed to mix downhole at a desired location and form the sealant composition. Alternatively, the pH increasing material, mixed in with the drilling fluid or in a separate inert carrier fluid (e.g., water), can be pumped down the annular wellbore space outside the drill pipe, and the alkali swellable latex can be pumped down the drill pipe. Again, the two streams are allowed to mix downhole at a desired location and form the sealant composition. Methods for introducing compositions into a wellbore to seal subterranean zones are described in U.S. Pat. Nos. 5,913,364; 6,167,967; and 6,258,757, which are incorporated by reference herein in their entirety. It is to be understood that drilling fluid includes any suitable drilling fluid such as oil based, water based, water, and the like.

In one embodiment, the sealant composition is introduced to the wellbore to prevent the loss of aqueous or non-aqueous drilling fluids into loss-circulation zones such as voids, vugular zones, and natural or induced fractures while drilling. The drilling fluid and pH increasing material are pumped into the wellbore separately from the alkali swellable latex and allowed to mix with the alkali swellable latex downhole near the loss-circulation zone. When the alkali swellable latex and pH increasing material contact each other at downhole conditions, the pH increasing material causes the pH of the alkali swellable latex to increase and thereby increase its viscosity. In one embodiment, it is often desired to hasten the viscosification reaction for swift plugging of the voids. In another embodiment, it is often desired to prolong or delay the viscosification for deeper penetration into the voids. The desired fluid time can be achieved by adding encapsulated pH increasing material to the fluid that does not contain the alkali swellable latex. The sealant composition is formed and provides a relatively viscous mass inside the loss-circulation zone. The sealant composition can also form a non-flowing, intact mass inside the loss-circulation zone. This mass plugs the zone and inhibits loss of subsequently pumped drilling fluid, which allows for further drilling. Additives can also be added to the drilling fluid and pumped into the wellbore with the pH increasing material. For instance, fluid absorbing materials, particulate materials, resins, superabsorbers, viscosifying agents, dispersing agents, and combinations thereof can be pumped with the drilling fluid and pH increasing material. Viscosifying agents, dispersing agents, or both, can also be introduced to the wellbore with the alkali swellable latex. It is to be understood that the drilling fluid may include a non-aqueous fluid such as a diesel, a mineral oil, an internal olefin, a linear alpha-olefin, an ester, or combinations thereof. In an alternate embodiment, the pH increasing material may be a cement slurry comprising for example, Portland cement.

In one embodiment, sealant compositions that include alkali swellable latex and the pH increasing material may be employed in well completion operations such as primary and secondary cementing operations. In such an embodiment, the alkali swellable latex and pH increasing material are introduced to the wellbore in the same flowpath, with the pH increasing material encapsulated. The encapsulation allows the pH increasing material to be time released. The pH increasing material is suitably encapsulated to time its release and contact with the alkali swellable latex at the desired wellbore location. In alternative embodiments, the pH increasing material is not encapsulated. The alkali swellable latex and pH increasing material can be introduced sequentially (e.g., to prevent premature alkali swellable latex viscosification) or together into the wellbore. In one embodiment, the alkali swellable latex is pumped through the drill pipe followed by a spacer fluid such as weighted viscosified aqueous fluid or weighted non-aqueous fluid. The pH increasing material is then pumped through the drill pipe. Alternatively, the pH increasing material can be pumped first and the alkali swellable latex last. In primary cementing, such a sealant composition may be displaced into an annulus of the wellbore and allowed to set such that it isolates the subterranean formation from a different portion of the wellbore. The sealant composition thus forms a barrier that prevents fluids in that subterranean formation from migrating into other subterranean formations. Within the annulus, the sealant composition also serves to support a conduit, e.g., casing, in the wellbore. In one embodiment, the wellbore in which the sealant composition is positioned belongs to a multilateral wellbore configuration. It is to be understood that a multilateral wellbore configuration includes at least two principal wellbores connected by one or more ancillary wellbores. In secondary cementing often referred to as squeeze cementing, the sealant composition may be strategically positioned in the wellbore to plug a void or crack in the conduit, to plug a void or crack in the hardened sealant (e.g., cement sheath) residing in the annulus, to plug a relatively small opening known as a microannulus between the hardened sealant and the conduit, and so forth. In such cases, the set cement may serve as the pH increasing material thus involving injecting with pressure a stream comprising the latex without the base producing material. Various procedures that may be followed to use the sealant composition in a wellbore are described in U.S. Pat. Nos. 5,346,012 and 5,588,488, which are incorporated by reference herein in their entirety.

In another embodiment, the sealant composition containing alkali swellable latex and a pH increasing material but no cementitious material may be used in well completion operations such as primary operations. In such an embodiment, the alkali swellable latex and pH increasing material are introduced to the wellbore in the same stream, with the pH increasing material encapsulated. In alternative embodiments, the pH increasing material is not encapsulated. The alkali swellable latex and pH increasing material can be introduced sequentially or together into the wellbore. As an example, they may be placed behind expandable casings or used for consolidating gravel packs or incompetent formations. Further, such sealant compositions may be used in remedial operations such as sealing leaks, cracks, or voids and forming temporary plugs for the purpose of isolating zones to divert subsequent fluids and the like. Additional disclosure regarding the use of cementless sealant compositions for such applications can be found in U.S. Pat. Nos. 5,159,980 and 6,668,928, which are incorporated by reference herein in their entirety.

In other embodiments, additives are also pumped into the wellbore with the pH increasing material and alkali swellable latex. For instance, fluid absorbing materials, particulate materials, resins, superabsorbers, viscosifying agents, dispersing agents, and combinations thereof can be pumped in the stream with the drilling fluid and pH increasing material.

To further illustrate various illustrative embodiments of the present invention, the following examples are provided.

EXAMPLE I

Tests were conducted using various sample loss circulation treatment fluids and a Hassler sleeve test cell containing a synthetic core. Synthetic cores having a length of 4.2 inches and a diameter of 1 inch were prepared by mixing different grades of sand (5% 12/20 mesh sand; 25% 20/40 mesh sand; 70% Oklahoma No. 1 sand) with a resin mixture. The resin mixture for a single synthetic core comprised a bisphenol-A epoxide resin (ER-1 of Applied Poleramic Inc., 4 ml), a gamma-aminopropyl tri-alkoxy silane coupling agent (PLASTIC FIXER of Halliburton Energy Services, Inc., 0.3 ml), and a diamine hardener (for example EH-102 of Applied Poleramic Inc., 4 ml). The mixture was charged into a TEFLON tube containing, in the center of the tube, a TEFLON rectangular stick or a stainless steel stick that had been machined to have the desired tapering width along the length of the stick. The height of the stick was 12 mm. When the sand mix was partially cured, the stick was pulled out, and the mix was allowed to set in the tube at 140° F. for at least 6 hrs. Therefore, the synthetic core was formed with a simulated fracture therein where the width of the simulated fracture was based on the tapering of the stick. Thus, synthetic cores were formed having a wider end of about 3 mm and a narrower end ranging from about 1 mm to about 3 mm, depending on the tapering of the stick.

Referring now to FIG. 1, the test equipment used in this example is illustrated. A synthetic core, prepared as described above, was fitted into a rubber sleeve (not shown), inserted into a metal receptacle (not shown), and mounted in a Hassler sleeve test cell 2, having one end thereof designated as the well bore side 4 and one end thereof designated as the formation side 6. The synthetic core was mounted so that the wider end of the simulated fracture faced well bore side 4. The pressure on well bore side 4 of test cell 2 was measured by a pressure transducer 8 mounted on well bore side 4 of test cell 2. The metal cylinder containing the core inside the rubber sleeve was connected to a pump 5 with which a desired pressure was applied on the rubber sleeve to achieve an impermeable fit between the core and the rubber sleeve. The test cell 2 also was connected to a thermostat (not shown) to control the temperature during testing.

A drilling fluid reservoir 10 and a brine reservoir 12 were provided, and the bottoms of these two reservoirs were connected to a three-way valve 14 by conduits 16 and 17, respectively. Drilling fluid reservoir 10 contained a control drilling fluid, and brine reservoir 12 contained an API brine. The outlet of three-way valve 14 was connected to the inlet of a pump 18 by conduit 20. Pump 18 had a programmable flow rate and pressure. The outlet of pump 18 was connected to the entrance of well bore side 4 of test cell 2 by a conduit 22. Thus, by appropriate manipulation of three-way valve 14, pump 18 was used to direct either the control drilling fluid or the API brine to test cell 2. Also, conduit 22 was connected to valve 23, which was connected to atmosphere.

A sample reservoir 24 was also provided, and the top of sample reservoir 24 was connected to a source of pressurized nitrogen, generally designated by numeral 26. Sample reservoir 24 contained a sample loss circulation treatment fluid. The bottom outlet of sample reservoir 24 was optionally connected to the top of the entrance of well bore side 4 of test cell 2 by a conduit 28. Test cell 2 had a three-way design to connect sample reservoir 24 to test cell 2 by conduit 28 without having to disconnect conduit 22.

The exit of formation side 6 of test cell 2 was connected to a three-way valve 30 by conduit 31. One outlet connection of three-way valve 30 was connected to atmosphere. The other outlet connection of three-way valve 30 was connected to the bottom of an oil reservoir 32 that contained a mineral oil by conduit 34. The top of oil reservoir 32 was connected to a back pressure regulator 36, the pressure of which was adjusted with nitrogen pressure. The other side of back pressure regulator 36 was connected to atmosphere.

The test procedure was designed to determine the ability of a loss circulation composition to withhold pressure applied from a drilling fluid when applied on the wider end of the simulated fracture, as described in the Forward Flow Procedure listed below. Additionally, if the loss circulation composition withstood the pressure during the forward flow procedure, the ability of the loss circulation composition to withstand pressure applied from formation fluids was determined, as described in the Reverse Flow Procedure listed below.

First, pump 18 was used to pass the control drilling fluid from drilling fluid reservoir 10 through the synthetic core within test sleeve 2, from well bore side 4 to formation side 6. Three-way valve 30 was open to atmosphere. Once the synthetic core was wet with the control drilling fluid, the pump 18 was stopped, and the three-way design into test cell 2 at well bore side 4 was altered to allow for drilling fluid flow from conduit 28 through which the sample reservoir 24 was connected to test cell 2. The three-way design restricted flow back into conduit 22. The sample loss circulation treatment fluid (sealant composition) was then prepared by adding the components thereof into a separate beaker (directly into sample reservoir 24 if it the fluid viscosified too quickly) and was stirred for about one minute with a spatula. Upon preparation, the sample loss circulation treatment fluid was charged into sample reservoir 24. Next, pressure from the source of pressurized nitrogen 26 was used to push the loss circulation treatment fluid through the synthetic core within test sleeve 2, from well bore side 4 to formation side 6. The loss circulation treatment fluid was pushed through the synthetic core until it extruded though the formation side 6 of test cell 2. The loss circulation composition within the sample loss circulation treatment fluid plugged the simulated fracture of the synthetic core, which was indicated by stoppage of fluid drainage with minimum applied pressure of about 500 psi. Subsequently, test cell 2 was disconnected from conduit 28 and conduit 31, and any solid on the face or bottom of the synthetic core or any conduits was cleaned. Once cleaned, test cell 2 was reconnected to conduit 31 and conduit 22 so that the outlet of pump 18 was connected to test cell 2.

Next, pump 18 was used to pump the control drilling fluid from drilling fluid reservoir 10 to fill conduit 22 with the control drilling fluid. Also, conduit 31 and conduit 34 were filled with mineral oil from oil reservoir 32 by controlling three-way valve 30, after which three-way valve 30 was closed to atmosphere. Next, the drilling fluid in drilling fluid reservoir 10 and test cell 2 were heated to 160° F. After a desired time, usually 90 minutes, at 160° F., pump 18 was set at a flow rate of 2 milliliters per minute (ml/min) and a pressure of 100 psi. In addition, a back pressure of 100 psi was applied to back pressure regulator 36 with nitrogen gas. Additionally, pump 5 was used to apply a pressure on the rubber sleeve of 300 psi to about 600 psi higher than the pressure applied by pump on well bore side 4. The pressure at the face of the synthetic core on well bore side 4 of test cell 2 was measured using pressure transducer 8. If the loss circulation composition withstood the initial pressure, the pressure applied to well bore side 4 (using pump 18) and the pressure applied to the rubber sleeve (using pump 5) were steadily increased in 100 psi increments up to the maximum operating pressure of test cell 2 while observing the flow rate of oil dripping through back pressure regulator 36. If the flow rate of oil dripping through back pressure regulator 36 reached 2 ml/min or the pressure read by pressure transducer 8 dropped to zero, the plug of the loss circulation composition in the simulated fracture of the synthetic core failed to withstand the pressure applied thereto by the control drilling fluid. When the pressure of pump 18 reached the maximum operating pressure of test cell 2, the pressure was held for 30 minutes, and the flow of oil through back pressure regulator 36 was observed.

Figure 2:
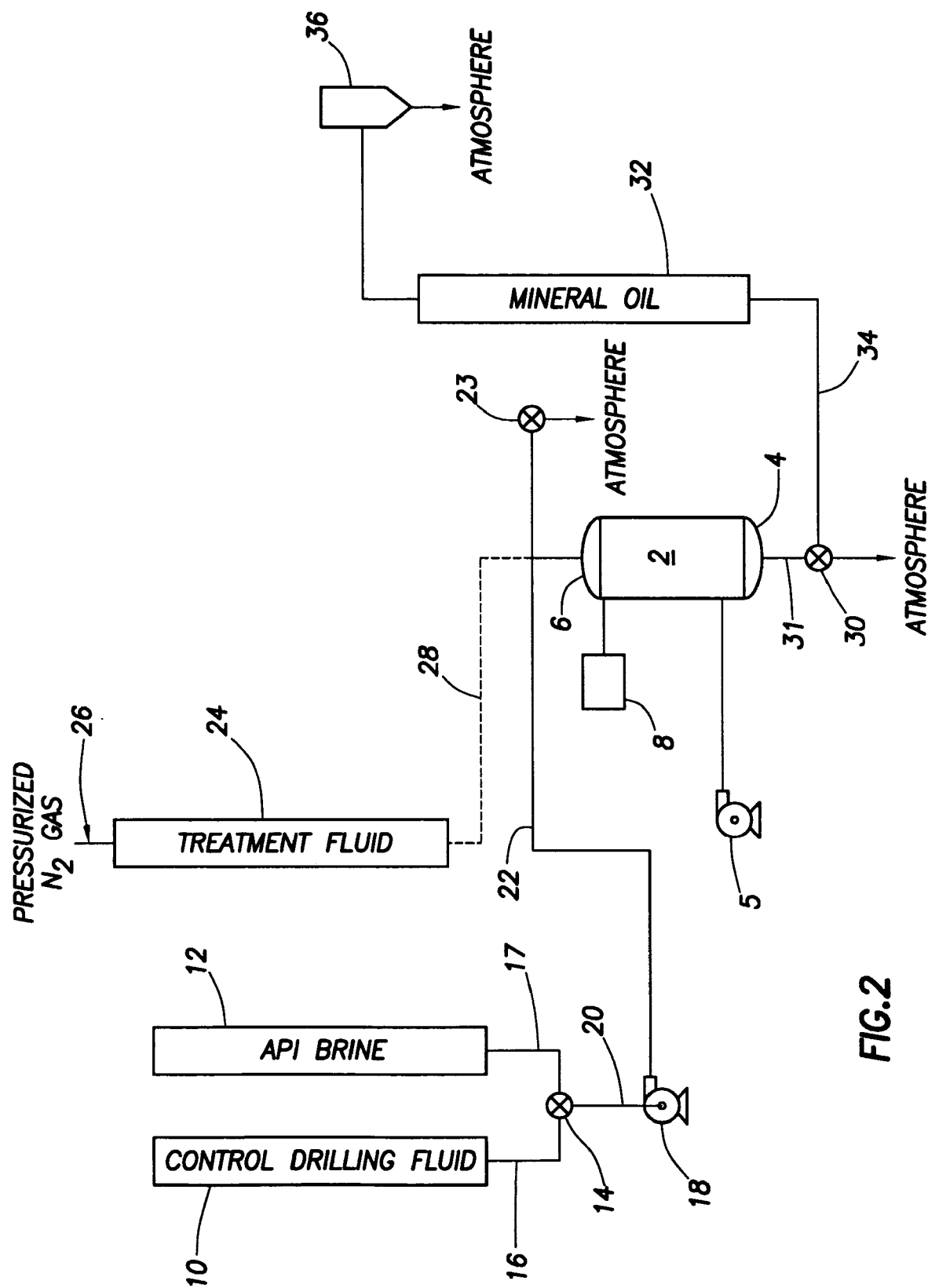
FIG. 2 illustrates a test procedure for applying pressure from a formation fluid to a sealant composition.

First, test cell 2 was reversed within the system, as shown in FIG. 2. Accordingly, pump 18 was connected to the formation side 6 of test cell 2 by conduit 22. Likewise, well bore side 4 was connected to three-way valve 30 by conduit 31. Also, pressure transducer 8 was positioned to measure the pressure on formation side 6 of test cell 2.

Next, pump 18 was used to flush any of the control drilling fluid in conduit 22 through valve 23 to atmosphere. Next, pump 18 was set to provide the API brine to the formation side 6 of test cell 2 at a flow rate of 2 ml/min and a pressure of 100 psi. In some tests, pump 18 provided the control drilling fluid. Because test cell 2 was reversed, the pressure from the API brine was applied to the narrow end of the simulated fracture in the synthetic core. In addition, 100 psi was applied to back pressure regulator 36 with nitrogen gas. Additionally, pump 5 was used to apply a pressure on the rubber sleeve of 300 psi to 600 psi higher than that applied by pump 18 on formation side 6. The pressure at the face of the synthetic core on formation side 6 of test cell 2 was measured using pressure transducer 8. If the loss circulation composition withstood the initial pressure, the pressure applied to it by the API brine (using pump 18) and the pressure applied to the rubber sleeve (using pump 5) were steadily increased in 100 psi increments up to the maximum operating pressure of test cell 2 while the flow rate of oil dripping through back pressure regulator 36 was observed. If the flow rate of oil dripping through back pressure regulator 36 reaches 2 ml/min or the pressure read by pressure transducer 8 drops to zero, the plug of the loss circulation composition in the simulated fracture of the synthetic core failed to withstand the pressure applied thereto by the control drilling fluid. When the pressure of pump 18 reached the maximum operating pressure of test cell 2 or the loss circulation composition failed, the heat was turned off, and pump 18 and back pressure regulator 36 were stopped.

Figure 3:
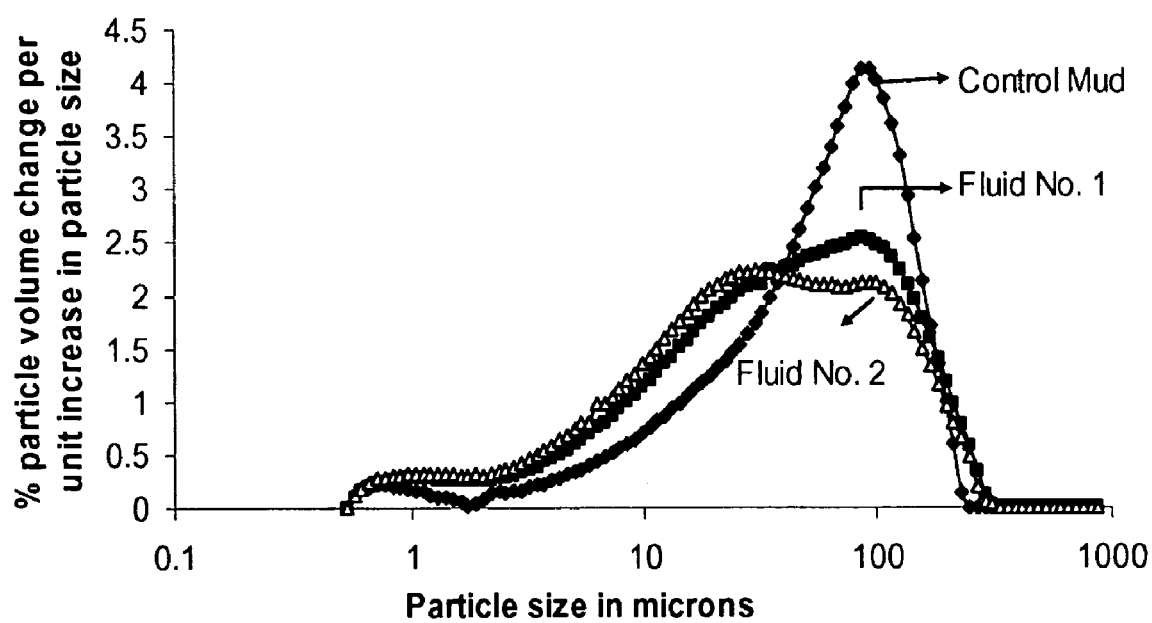
FIG. 3 depicts the effects on particle volume change by particle size.

Tests were performed on a variety of sample lost circulation treatment fluids comprising a drilling fluid and particulates using the procedure described above. For this series of tests, the control drilling fluid was a synthetic oil-based drilling fluid that is commercially available under the trademark PETROFREE fluid from Baroid Drilling Fluids, Houston, Tex. Additionally, an oil wetting lecithin-based agent was added to the control drilling fluid in an amount of 2 pounds per barrel of the drilling fluid. The oil wetting lecithin-based agent is commercially available as DRILTREAT additive from Baroid Drilling Fluids, Houston, Tex. An additional additive is an emulsifier that is commercially available as EZ MUL NT from Baroid Drilling Fluids, Houston, Tex., which was also added to the control drilling fluid in an amount of 6 pounds per barrel of the drilling fluid to improve the oil wetting ability of the control drilling fluid. To prepare the sample lost circulation treatment fluids used in the present example, the control drilling fluid, prepared as described above, was mixed with particles of the type and amount shown in Table II. Referring now to FIG. 3, a graphical illustration of the percent volume change per unit particle size increase versus particle size is shown for the control drilling mud, Sample Lost Circulation Treatment Fluid No. 2, and Sample Lost Circulation Treatment Fluid No. 3.

TABLE II

| Component | Control Drilling Fluid | Sample Lost Circulation Treatment Fluid | | |
|---|---|---|---|---|
| | | No. 1 | No. 2 | No. 3 |
| BARACARB 150 (ppb) | None | None | None | 15 |
| BARACARB 600 (ppb) | None | 15 | 15 | 15 |
| STEELSEAL (ppb) | None | 15 | 15 | 15 |
| REV DUST (ppb) | None | None | 15 | 15 |

The results of the tests utilizing the above-described sample lost circulation treatment fluids are provided in Table III.

TABLE III

| Sample Lost Circulation Treatment Fluid | Simulated Fracture Width, mm→mm | Forward Flow Test Results | | Reverse Flow Test Results | |
|---|---|---|---|---|---|
| | | Applied Pump Pressure (psi) | Maximum Pressure Measured at the Core Face (psi) | Fluid | Maximum Pressure Measured at the Core Face (psi) |
| No. 1 | 3 → 1 | 0 | Failure at 0 psi pump pressure. | N/A | N/A |
| No. 2 | 3 → 1 | 2500 | No failure up to 1800 psi[1] | API Brine | Failure at 200 psi |
| No. 3 | 3 → 1 | 2500 | Failure at 1480 psi[2] | N/A | N/A |
| No. 3 | 3 → 2 | 0 | Failure at 0 psi | N/A | N/A |

[1] Average taken across four tests.
[2] Average taken across three tests.

Thus, the results illustrate that varying the particle size distribution within a lost circulation treatment fluid may improve the ability of the lost circulation treatment fluid to prevent circulation losses to different degrees but may be inadequate to withstand imposed pressures due to the fluid pressures from the wellbore or the formation.

Next, tests were performed on a variety of sample lost circulation treatment fluids utilizing the same procedures. For this series of tests, the control drilling fluid was a synthetic oil-based drilling fluid of 12 ppg that is commercially available as PETROFREE fluid from Baroid Drilling Fluids, Houston, Tex. To prepare the sample lost circulation treatment fluids used in the present example, the control drilling fluid, prepared as described above, was mixed with particles of the type and amount shown in Table IV.

TABLE IV

| Component | Control Drilling Fluid | Sample Lost Circulation Treatment Fluid | | |
|---|---|---|---|---|
| | | No. 3[1] | No. 4[2] | No. 5 |
| BARACARB 150 (ppb) | None | 15 | None | None |
| BARACARB 600 (ppb) | None | 15 | 75 | None |
| STEELSEAL (ppb) | None | 15 | 75 | 30 |
| REV DUST (ppb) | None | 15 | 15 | 15 |
| PHENOSEAL Fine Grade (ppb) | None | None | None | 30 |

[1] Same as that listed in Table 1.
[2] A polymeric suspending aid, commercially available as TEMPURUS suspending agent from Baroid Drilling Fluids, Houston, TX, was added to Sample No. 4 in an amount of 18.5 ppb.

The results of the tests utilizing the above-described sample lost circulation treatment fluids are provided in Table V. The results listed for Sample Lost Circulation Treatment Fluid No. 3 in Table V are from Table III and are listed in Table V for comparative purposes.

TABLE V

| Sample Lost Circulation Treatment Fluid | Simulated Fracture Width, mm→mm | Forward Flow Test Results | | Reverse Flow Test Results | |
|---|---|---|---|---|---|
| | | Applied Pump Pressure (psi) | Maximum Pressure Measured at the Core Face (psi) | Fluid | Maximum Pressure Measured at the Core Face (psi) |
| No. 3 | 3 → 2 | 0 | Failure at 0 psi pump pressure. | N/A | N/A |
| No. 4 | 3 → 2 | 0 | Failure at 0 psi pump pressure. | N/A | N/A |
| No. 5 | 3 → 2 | 2500 | Failure at 1440 psi[1] pump pressure. | N/A | N/A |

[1] Average taken across two tests.

The results in Table V show that particulates are either ineffective or only partially effective in withstanding applied pressures when the fracture widths are large.

Next, tests were performed to compare the effectiveness of the latex compositions for their ability to provide not only loss circulation prevention but for their ability to withstand applied pressures. The tests compared the pressure sustainability of a conventional composition comprising latex (LATEX 2000, a styrene-butadiene latex available from Halliburton Energy Services, Inc.) and drilling mud (Runs 1 and 2), with sealant compositions having an increased viscosity comprising alkali swellable latex and drilling fluid (Runs 3-5). Run 3 was prepared with an inadequate amount of pH increasing material, which was 1.4 g of sodium carbonate. Run 4 was prepared with a sufficient amount of pH increasing material, which was 10 g of sodium phosphate. Run 5 was prepared with a sufficient amount of pH increasing material, which was 4 g of sodium phosphate, and particulate additions. The tests simulated the mixing downhole of a latex stream with a drilling fluid plus pH increasing material stream to form the composition of each Run by mixing the two fluids before treating the fracture, as described in detail below. In this case of Run 5, the particulates were added to the drilling fluid to simulate addition of incorporating particulates in the drilling fluid prior to contacting with the fluid containing the alkali swellable latex.

The formulations for the sealant compositions Run 1 through Run 5 are in Table VI. The drilling fluid stream used for each Run comprised of clay-free synthetic based ACCOLADE plus 5% by weight REV DUST, commercially available from Baroid Drilling Fluids, Houston, Tex. For Run 1 through Run 5, an equal volume of 35 cc drilling fluid and 35 cc latex-based fluid was mixed in forming the final composition. The composition of each Run was provided to treat a fracture of 3 mm on the wellbore side and either 1 mm (Runs 1, 3, and 4) or 2 mm (Runs 2 and 5) on the formation side. The procedures of Example 1 were followed to determine the maximum pressure to dislodge the final composition. The results are in Table VI.

TABLE VI

| Run | Composition[1] | | | Fracture Dimensions (wellbore side → formation side) | Max. Pressure Sustained by Wellbore Side of Fracture Face Before Failure (psi) | Max. Pressure Sustained by Formation Side of Fracture (psi) |
|---|---|---|---|---|---|---|
| 1 | Conventional latex | Organophilic clay + pH material | 40 g | 3 --> 1 mm | 540 | Not tested; premature failure |
| | | Water | 60 cc | | | |
| | | Stabilizer | 7.5 cc | | | |
| | | LATEX 2000 | 66 cc | | | |
| 2 | Conventional latex | Organophilic clay + pH material | 40 g | 3 --> 2 mm | 460 | Not tested; premature failure |
| | | Water | 60 cc | | | |
| | | Stabilizer | 7.5 cc | | | |
| | | LATEX 2000 | 66 cc | | | |
| 3 | Sealant Composition with Alkali Swellable Latex (INADEQUATE pH Increasing Material) | TYCHEM | 31.5 cc | 3 --> 1 mm | <100 | Not tested; premature failure |
| | | Water | 20 cc | | | |
| | | Organophilic clay | 13.33 g | | | |
| | | Stabilizer | 2.5 cc | | | |
| | | Sodium Carbonate (pH material) | 1.4 g | | | |
| 4 | Sealant Composition with Alkali Swellable Latex (SUFFICIENT pH Increasing Material) | TYCHEM | 20 cc | 3 --> 1 mm | 1700 | Not tested; premature failure |
| | | Water | 10 cc | | | |
| | | Organophilic clay | 10 g | | | |
| | | Stabilizer | 2.5 cc | | | |
| | | Sodium Phosphate (pH material) | 10 g | | | |
| 5 | Sealant Composition with Alkali Swellable Latex (OPTIMAL pH Increasing | TYCHEM | 24 cc | 3 --> 2 mm | >2500 | >2500 |
| | | Oil Mud Conditioner | 0.07 g | | | |
| | | Water | 12 cc | | | |
| | | Organophilic clay | 12 g | | | |
| | | Sodium Phosphate (pH material) | 4 g | | | |

TABLE VI-continued

| Run | Composition[1] | Fracture Dimensions (wellbore side → formation side) | Max. Pressure Sustained by Wellbore Side of Fracture Face Before Failure (psi) | Max. Pressure Sustained by Formation Side of Fracture (psi) |
|---|---|---|---|---|
| | Material) STEELSEAL | 30 ppb | | |
| | PHENOSEAL | 30 ppb | | |

[1] All formulations with a latex contained a few drops of a defoamer, D AIR 3000 L available from Halliburton Energy Services, Inc.

As illustrated in Table VI, the Runs using conventional latex (Runs 1 and 2) provided lower pressure containment pressures than sealant compositions with sufficient or optimal amounts of pH increasing material (Runs 4 and 5). In addition, increasing the viscosity of alkali swellable latex with pH increasing material allowed for higher sustainable pressures in the wellbore than that of alkali swellable latex with an insufficient amount of pH increasing material (Run 3), which shows that if there is an insufficient amount of pH increasing material then the alkali swellable latex may not have the ability to viscosify, conglomerate, and form a seal in the fracture. Additionally, by comparing the results for Composition No. 5 in Table V with the results from Run 5 in Table VI, it is clear that a combination of particulates of suitable particle size distribution and alkali swellable latex are effective in providing improved pressure sustainability for wider fractures.

EXAMPLE II

Example II provided a comparison of sealant material strength for different amounts of pH increasing material (sodium carbonate). Each formulation provided an aqueous fluid, drilling fluid, and an observed sealant material strength. Table VII shows the composition of the aqueous fluid and drilling fluid and also the observed results. The strength of the sealant material was estimated by hand stretching and squeezing of the material. REV DUST was added to the drilling fluid in an amount of 5% by weight to simulate solids that are produced when drilling.

TABLE VII

| Components | | Formulation 1 | Formulation 2 |
|---|---|---|---|
| Aqueous Fluid | | 2.5 cc STABILIZER | 2.5 cc STABILIZER |
| | | 20 cc Water | 20 cc Water |
| | | 31.5 cc TYCHEM | 31.5 cc TYCHEM |
| | | 13.33 g Organophilic clay + viscosifier | 20 g Organophilic clay + viscosifier |
| Drilling Fluid | | 1:1 vol. ratio ACCOLADE (w/5% Rev Dust) | 1:1 vol. ratio ACCOLADE (w/5% Rev Dust) |
| | | 1.4 g Sodium Carbonate | 10.4 g Sodium Carbonate |
| Strength of the Formed Sealant Material | | Weak, not intact | Strong, pliable, rubbery, leathery feel, intact mass |

The results as shown in Table VII indicate that increasing amounts of pH increasing material (sodium carbonate) provide a stronger, more flexible, and intact sealant composition.

EXAMPLE III

Tests were conducted to study the effectiveness of a variety of organic, inorganic and polymeric pH increasing materials. Their effectiveness was compared by manually testing the viscous product for its physical strength. The results are summarized in Tables VIII and IX. A mixture of 20 ml of the fluid containing the alkali swellable latex as described in Run 3 of Example I (with the exception that the sodium carbonate was omitted) was combined with a mud in the volume ratio indicated. The pH increasing materials indicated in Tables VIII and IX were added to the mixture and briefly stirred with a spatula. The mixture was kept in an oven at 160° F. for 3 hrs, and the resulting material was manually tested for its physical properties. The results from inorganic pH increasing materials are listed in Table VIII and those from organic and polymeric pH increasing materials are listed in Table IX.

TABLE VIII

| pH increasing Material | Amount | Latex Slurry to Mud Ratio | Mud Used | Observation | Potential Use? |
|---|---|---|---|---|---|
| Encap. LiOH | 5 ppb | 1:1 | IO/Ester Blend | Did not set up (pasty) | |
| Encap. LiOH | 20 ppb | 1:1 | IO/Ester Blend | Did not set up (pasty) | |
| Encap. LiOH | 35 ppb | 1:1 | IO/Ester Blend | Set up weak, not intact mass | |
| Encap. LiOH | 50 ppb | 1:1 | IO/Ester Blend | Set up weak, not intact mass | |
| Encap. LiOH | 65 ppb | 1:1 | IO/Ester Blend | Strong rubbery mass | ✓ |
| Encap. LiOH | 80 ppb | 1:1 | IO/Ester Blend | Strong rubbery mass | ✓ |
| Encap. LiOH | 75 ppb | 1:1 | Diesel | Did not set up (pasty) | |
| Encap. LiOH | 100 ppb | 1:1 | Diesel | Set up weak, not intact mass | |
| $Na_3PO_4$ | 5 ppb | 1:1 | IO/Ester Blend | Did not set up (pasty) | |
| $Na_3PO_4$ | 20 ppb | 1:1 | IO/Ester Blend | Did not set up (pasty) | |
| $Na_3PO_4$ | 35 ppb | 1:1 | IO/Ester Blend | Set up weak, not intact | |
| $Na_3PO_4$ | 50 ppb | 1:1 | IO/Ester Blend | Tough, but not intact | ✓ |
| $Na_3PO_4$ | 65 ppb | 1:1 | IO/Ester Blend | Tough, but not intact | ✓ |
| $Na_3PO_4$ | 80 ppb | 1:1 | IO/Ester Blend | Tough, but not intact | ✓ |
| $Na_3PO_4$ | 100 ppb | 1:1 | Diesel | Set up weak, not intact mass | |
| $Na_2CO_3$ | 5 ppb | 1:1 | IO/Ester Blend | Did not set up (pasty) | |
| $Na_2CO_3$ | 20 ppb | 1:1 | IO/Ester Blend | Did not set up (pasty) | |
| $Na_2CO_3$ | 35 ppb | 1:1 | IO/Ester Blend | Soft rubbery mass | ✓ |
| $Na_2CO_3$ | 50 ppb | 1:1 | IO/Ester Blend | Soft rubbery mass | ✓ |
| $Na_2CO_3$ | 65 ppb | 1:1 | IO/Ester Blend | Soft rubbery mass | ✓ |
| $Na_2CO_3$ | 80 ppb | 1:1 | IO/Ester Blend | Soft rubbery mass | ✓ |
| $Na_2CO_3$ | 75 ppb | 1:1 | Diesel | Strong rubbery mass | ✓ |
| $Na_2CO_3$ | 100 ppb | 1:1 | Diesel | Strong rubbery mass | ✓ |
| Encap. $Na_3PO_4$ | 80 ppb | 1:1 | Diesel | Fluffy, deformable pieces | |

All samples cured at 160° F. for 3 hours.

TABLE IX

| Activator | Amount | Latex Slurry Amount (cc) | Observation | Potential Use? |
|---|---|---|---|---|
| STRATALOK D | 1 cc | 20 | Crumbly, dry pieces | |
| STRATALOK D | 5.7 g | 20 | Flexible, rubbery mass | ✓ |
| STRATALOK D | 11.4 g | 20 | Very flexible, rubbery mass | ✓ |
| STRATALOK E | 0.5 cc | 20 | Thick paste | |
| STRATALOK E | 1 cc | 20 | Sticky, rubbery chunks | ✓ |
| STRATALOK B | 1 cc | 20 | Thick paste | |
| JEFFAMINE | 1 cc | 20 | Hard, crumbly, dry pieces | |
| CHITOCLEAR | 0.4 g | 20 | Pasty | |
| Triethanolamine | 1 cc | 20 | Thick paste | |
| Triethanolamine | 0.2 cc | 20 | Crumbly paste | |
| HZ-20 | 1 cc | 20 | Soft, crumbly pieces | |
| ASTROMEL 01 | 1 cc | 20 | Hard, crumbly, dry pieces | |

EXAMPLE IV

A 15.6 pounds per gallon cement slurry was prepared with Class A cement, water (44% water by weight of cement) and TYCHEM 68710 latex (0.30 gallons per sack of cement or 1.1% solid latex polymer content by weight of cement) according to American Petroleum Institute (API) Recommended Practice 10B, $22^{nd}$ Edition 1997. The fluid loss of the slurry was determined at room temperature according to API 10 procedure described in the preceding reference. The fluid loss was measured as 42 ml/10 sec, which is calculated to be 1170 ml/30 min. A control slurry with cement and water typically showed a calculated API fluid loss of 1600 ml/30 min.

EXAMPLE V

The mechanical property modification of cement compositions by the alkali swellable latex was measured by comparing the mechanical properties of a control slurry prepared using Class H cement and water with those containing the latex materials. The control slurry was prepared by API Specification mentioned in Example IV. The latex slurry was prepared by adding a defoamer, DAIR 3000L, the stabilizing surfactant STABILIZER 434C (10% by volume of the latex) and the latex to the mix water followed by addition of cement with agitation at 1,000 rpm for 45 seconds. The slurries were poured into tensile dog-bone shaped briquettes according to the procedure described for the test CRD-C260-01 in the U.S. Army Corps of Engineers' Handbook for Concrete and Cement. The slurry was also poured into 2"×5" cylindrical brass molds to perform load versus displacement studies under unconfined conditions using MTS load frame equipment manufactured by MTS Systems Corporation of Eden Prairies, Minn. according to ASTM D3148-02 (Standard Test Method for Elastic Moduli of Intact Rock Core in Uniaxial Compression). The cylindrical samples and the tensile briquettes were cured in an autoclave at 190° F. under a pressure of 3,000 psi for 72 hrs. The tensile strengths were measured on a Tinius Olsen Strength Tester equipment. The results are presented in Table X.

TABLE X

| Slurry Number | Water % bwoc | TYCHEM 68710 Gal/sack | Slurry Density, ppg | Tensile Strength Psi | Compressive Strength[1] psi | Elastic Modulus psi | Poisson's Ratio |
|---|---|---|---|---|---|---|---|
| Comparative Example | 39.4 | None | 16.4 | 430 | 6850 | $1.81 \times 10^6$ | 0.20 |
| 1 | 40.1 | 1.4[2] | 15.73 | 575 | 5390 | $1.36 \times 10^6$ | 0.15 |

[1] From Load vs Displacement measurements
[2] 0.14 gal/sack of STABILIZER 434C was also added to the mix water.

The results in Table X show that the mechanical properties of a cement composition can be improved (such as reduction in brittleness and improvement of tensile strength) may be achieved by the addition of alkali swellable latexes to the cement compositions.

Although the present invention and its advantages have been described in detail, it should be understood that various changes, substitutions and alterations may be made herein without departing from the spirit and scope of the invention as defined by the appended claims.

What is claimed is:

1. A method of servicing a wellbore in contact with a subterranean formation, comprising:
   (A) separately introducing an alkali swellable latex and a pH increasing material to a wellbore; and
   (B) contacting the alkali swellable latex with the pH increasing material to form a sealant composition in situ within the wellbore,
   wherein the sealant composition further comprises a non-alkali swellable latex.

2. The method of claim 1, wherein a sufficient amount of the pH increasing material is contacted with the alkali swellable latex to provide the sealant composition having a pH of from about 7 to about 14.

3. The method of claim 1, wherein a sufficient amount of the pH increasing material is contacted with the alkali swellable latex to provide the sealant composition having a pH of from about 8 to about 13.

4. The method of claim 1, wherein the alkali swellable latex comprises an ethylenically unsaturated monomer containing at least one carboxylic acid functional group.

5. The method of claim 4, wherein the ethylenically unsaturated monomer containing at least one carboxylic functional group is present in the sealant composition in the amount of from about 5 to about 30% by weight of the monomers used in preparing the alkali swellable latex.

6. The method of claim 1, wherein the alkali swellable latex comprises a vinyl aromatic monomer, an ethylene, a butadiene, a vinylnitrile, an olefinically unsaturated ester of $C_1$-$C_8$ alcohol, or combinations thereof.

7. The method of claim 1, wherein the alkali swellable latex comprises a crosslinking agent.

8. The method of claim 7, wherein the crosslinking agent comprises a vulcanizing agent, a vulcanization accelerator, a vulcanization retarder, a defoamer, or combinations thereof.

9. The method of claim 1, wherein the alkali swellable latex comprises from about 0.1 to about 5 wt. % of a crosslinking agent by weight of monomer.

10. The method of claim 1, wherein the alkali swellable latex is prepared by emulsion polymerization.

11. The method of claim 1, wherein the pH increasing material comprises a base-producing material, a cement, or combinations thereof.

12. The method of claim 1, wherein the pH increasing material comprises a base-producing material, and wherein the base-producing material comprises alkali and alkali earth metal carbonates, alkali and alkali earth metal bicarbonates, alkali and alkali earth metal hydroxides, alkali and alkali earth metal oxides, alkali and alkali earth metal phosphates, alkali and alkali earth metal hydrogen phosphates, alkali and alkaline earth metal sulphides, alkali and alkaline earth metal salts of silicates, alkali and alkaline earth metal salts of aluminates, water soluble or water dispersible organic amines, polymeric amines, amino alcohols, or combinations thereof.

13. The method of claim 1, wherein the sealant composition further comprises a surfactant.

14. The method of claim 1, wherein the sealant composition further comprises a defoamer.

15. The method of claim 1, wherein the sealant composition further comprises a fluid absorbing material, a particulate material, a superabsorber, a viscosifying agent, or combinations thereof.

16. The method of claim 1, wherein the sealant composition further comprises a fluid absorbing material, and wherein the fluid absorbing material comprises organophilic clay, water swellable clay, a water absorbing mineral, an oil absorbing mineral, or combinations thereof.

17. The method of claim 1, wherein the sealant composition comprises a superabsorber, and wherein the superabsorber comprises a crosslinked polyacrylamide; a crosslinked polyacrylate; a crosslinked hydrolyzed polyacrylonitrile; a salt of carboxyalkyl starch; a salt of carboxyalkyl cellulose; a salt of any crosslinked carboxyalkyl polysaccharide; a crosslinked copolymer of acrylamide and acrylate monomers; a starch grafted with acrylonitrile and acrylate monomers; a crosslinked polymer of two or more of allylsulfonate, 2-acrylamido-2-methyl-1-propanesulfonic acid, 3-allyloxy-2-hydroxy-1-propane-sulfonic acid, acrylamide, and acrylic acid monomers; or combinations thereof.

18. The method of claim 1, wherein the sealant composition further comprises a viscosifying agent.

19. The method of claim 1, wherein the sealant composition is positioned in the wellbore to isolate the subterranean formation from a portion of the weilbore, to support a conduit in the weilbore, to plug a void or crack in the conduit, to plug a void or crack in a cement sheath disposed in an annulus of the wellbore, to plug an opening between the cement sheath and the conduit, to mitigate a loss of aqueous or non-aqueous drilling fluids into loss circulations zones, to be used as a fluid in front of a cement slurry, or to seal an annulus between the weilbore and an expandable pipe or pipe string.

20. The method of claim 1, further comprising combining the alkali swellable latex and the pH increasing material near a loss-circulation zone, to form the sealant composition in the loss-circulation zone.

21. A method of servicing a wellbore in contact with a subterranean formation, comprising:
   (A) introducing an alkali swellable latex and a pH increasing material to a wellbore; and (B) contacting the alkali swellable latex with the pH increasing material to form a sealant composition in situ within the wellbore, wherein the sealant composition comprises a thermosetting resin.

22. The method of claim 21, wherein the thermosetting resin comprises an amino resin, a phenolic resin, a furfural resin, or combinations thereof.

23. A method of servicing a wellbore in contact with a subterranean formation, comprising:
(A) introducing an alkali swellable latex and a pH increasing material to a wellbore; and
(B) contacting the alkali swellable latex with the pH increasing material to form a sealant composition in situ within the wellbore, wherein the pH increasing material comprises a cement,
and wherein the cement comprises a hydraulic cement.

24. The method of claim 23, wherein the hydraulic cement comprises a Portland cement, a pozzolana cement, a gypsum cement, a phosphate cement, a high alumina content cement, a silica cement, a high alkalinity cement, a magnesia cement, or combinations thereof.

25. The method of claim 23, wherein the sealant composition further comprises a surfactant.

26. The method of claim 23, further comprising reducing fluid loss from the cement.

27. The method of claim 23, further comprising increasing tensile strength, reducing elastic modulus of the cement, reducing brittleness of the cement, or combinations thereof.

28. A method of servicing a wellbore in contact with a subterranean formation, comprising:
(A) introducing an alkali swellable latex and a pH increasing material to a wellbore; and
(B) contacting the alkali swellable latex with the pH increasing material to form a sealant composition in situ within the wellbore, wherein the sealant composition further comprises particulate material, and further wherein the sealant composition comprises a first portion of particulate material having a weight mean particle size of less than about 20 microns; a second portion of particulate material having a weight mean particle size in the range of from about 25 microns to about 400 microns, and a third portion of particulate material having a weight mean particle size in the range of from about 450 microns to about 1,500 microns.

29. The method of claim 24, wherein at least about 20% by weight of the sealant composition comprises particulate material comprising resilient particles, thermoset polymer laminate particles, or combinations thereof.

30. A method of servicing a welibore in contact with a subterranean formation, comprising:
(A) introducing an alkali swellable latex and a pH increasing material to a welibore; and
(B) contacting the alkali swellable latex with the pH increasing material to form a sealant composition in situ within the wellbore, wherein the sealant composition comprises particulate materials in an amount between about 5 and about 35% by weight of the sealant composition.

31. A method of servicing a wellbore in contact with a subterranean formation, comprising:
separately introducing an alkali swellable latex and a pH increasing material to a wellbore;
contacting the alkali swellable latex with the pH increasing material to form a sealant composition in situ within the weilbore; and
introducing the pH increasing material and a drilling fluid or separate inert carrier fluid into the wellbore in a separate flowpath from the alkali swellable latex.

32. A method of servicing a welibore in contact with a subterranean formation, comprising:
(A) introducing an alkali swellable latex and a pH increasing material to a wellbore; and
(B) contacting the alkali swellable latex with the pH increasing material to form a sealant composition in situ within the wellbore,
further comprising introducing the pH increasing material and the alkali swellable latex to the wellbore in a flowpath, and
further comprising encapsulating the pH increasing material.

33. A method of increasing viscosity of a sealant composition, comprising:
(A) separately introducing an alkali swellable latex and a pH increasing material to a wellbore; and
(B) contacting the alkali swellable latex with the pH increasing material to form the sealant composition in situ within the wellbore, wherein the pH increasing material increases the viscosity of the sealant composition,
wherein step A) further comprises introducing the alkali swellable latex and the pH increasing material to the wellbore in separate flowpaths.

34. The method of claim 33, wherein a sufficient amount of the pH increasing material is contacted with the alkali swellable latex to increase the viscosity of the alkali swellable latex.

35. The method of claim 33, wherein a sufficient amount of the pH increasing material is contacted with the alkali swellable latex to provide the sealant composition having a pH of from about 7 to about 14.

36. The method of claim 33, wherein a sufficient amount of the pH increasing material is contacted with the alkali swellable latex to provide the sealant composition having a pH of from about 8 to about 13.

37. A method of increasing viscosity of a sealant composition, comprising:
(A) introducing an alkali swellable latex and a pH increasing material to a wellbore; and
(B) contacting the alkali swellable latex with the pH increasing material to form the sealant composition in situ within the wellbore, wherein the pH increasing material increases the viscosity of the sealant composition, wherein step A) further comprises introducing the alkali swellable latex and the pH increasing material to the wellbore in a flowpath, and wherein the pH increasing material is encapsulated.

38. A sealant composition for use in a wellbore, comprising: an alkali swellable latex and a pH increasing material, wherein the sealant composition formed in situ in the welibore has a pH of from about 7 to about 14, wherein the sealant composition further comprises particulate material, and wherein the sealant composition comprises a first portion of particulate material having a weight mean particle size of less than about 20 microns, a second portion of particulate material having a weight mean particle size in the range of from about 25 microns to about 400 microns, and a third portion of particulate material having a weight mean particle size in the range of from about 450 microns to about 1,500 microns.

39. The sealant composition of claim 38, wherein the sealant composition comprises a pH of from about 8 to about 13.

40. The sealant composition of claim 38, wherein the sealant composition comprises a pH of from about 9 to about 13.

41. The sealant composition of claim 38, wherein the alkali swellable latex comprises a vinyl aromatic monomer, an ethylene, a butadiene, a vinylnitrile, an olefinically unsaturated ester of $C_1$-$C_8$ alcohol, or combinations thereof.

42. The sealant composition of claim 38, wherein the alkali swellable latex comprises a crosslinking agent.

43. The sealant composition of claim 42, wherein the crosslinking agents comprise vulcanizing agents, vulcanization accelerators, vulcanization retarders, defoamers, or combinations thereof.

44. The sealant composition of claim 38, wherein the alkali swellable latex comprises from about 0.1 to about 5 wt. % of a crosslinking agent by weight of monomer.

45. The sealant composition of claim 38, wherein the alkali swellable latex is prepared by emulsion polymerization.

46. The sealant composition of claim 38, wherein the pH increasing material comprises a base-producing material, a cement, or combinations thereof.

47. The sealant composition of claim 38, wherein the pH increasing material comprises a base-producing material, and wherein the base-producing material comprises alkali and alkali earth metal carbonates, alkali and alkali earth metal bicarbonates, alkali and alkali earth metal hydroxides, alkali and alkali earth metal oxides, alkali and alkali earth metal phosphates, alkali and alkali earth metal hydrogen phosphates, alkali and alkaline earth metal sulphides, alkali and alkaline earth metal salts of silicates, alkali and alkaline earth metal salts of aluminates, water soluble or water dispersible organic amines, polymeric amines, amino alcohols, or combinations thereof.

48. The sealant composition of claim 38, wherein the sealant composition further comprises a surfactant.

49. The sealant composition of claim 38, wherein the sealant composition further comprises a defoamer.

50. The sealant composition of claim 38, wherein the pH increasing material comprises a cement, and wherein the cement comprises a hydraulic cement.

51. The sealant composition of claim 50, wherein the hydraulic cement comprises a Portland cement, a pozzolana cement, a gypsum cement, a phosphate cement, a high alumina content cement, a silica cement, a high alkalinity cement, a magnesia cement, or combinations thereof.

52. The sealant composition of claim 50, wherein the sealant composition further comprises a surfactant.

53. The sealant composition of claim 50, further comprising reducing fluid loss from the cement.

54. The sealant composition of claim 50, further comprising increasing tensile strength, reducing elastic modulus of the cement, reducing brittleness of the cement, or combinations thereof.

55. The sealant composition of claim 38, wherein the sealant composition further comprises a fluid absorbing material, a particulate material, a superabsorber, a viscosifying agent, a non-alkali swellable latex, or combinations thereof.

56. The sealant composition of claim 38, wherein the sealant composition further comprises a fluid absorbing material, and wherein the fluid absorbing material comprises organophilic clay, water swellable clay, a water absorbing mineral, an oil absorbing mineral, or combinations thereof.

57. The sealant composition of claim 38, wherein at least about 20% by weight of the sealant composition comprises particulate material comprising resilient particles, thermoset polymer laminate particles, or combinations thereof.

58. The sealant composition of claim 38, wherein the sealant composition comprises particulate materials in an amount between about 5 and about 35% by weight of the sealant composition.

59. The sealant composition of claim 38, wherein the sealant composition comprises a superabsorber, and wherein the superabsorber comprises a crosslinked polyacrylamide; a crosslinked polyacrylate; a crosslinked hydrolyzed polyacrylonitrile; a salt of carboxyalkyl starch; a salt of carboxyalkyl cellulose; a salt of any crosslinked carboxyalkyl polysaccharide; a crosslinked copolymer of acrylamide and acrylate monomers; a starch grafted with acrylonitrile and acrylate monomers; a crosslinked polymer of two or more of allylsulfonate, 2-acrylamido-2-methyl-1-propanesulfonic acid, 3-allyloxy-2-hydroxy-1-propane-sulfonic acid, acrylamide, and acrylic acid monomers; or combinations thereof.

60. The sealant composition of claim 38, wherein the sealant composition further comprises a viscosifying agent.

61. The sealant composition of claim 38, wherein the sealant composition further comprises a non-alkali swellable latex.

62. The sealant composition of claim 38, further comprising a drilling fluid.

63. The sealant composition of claim 38, wherein the alkali swellable latex further comprises an ethylenically unsaturated monomer containing at least one carboxylic acid functional group.

64. The sealant composition of claim 63, wherein the ethylenically unsaturated monomer containing at least one carboxylic functional group is present in the sealant composition in the amount of from about 5 to about 30% by weight of the monomers used in preparing the alkali swellable latex.

* * * * *